(12) United States Patent
Yamamoto et al.

(10) Patent No.: US 11,082,631 B2
(45) Date of Patent: Aug. 3, 2021

(54) IMAGE PROCESSING DEVICE

(71) Applicant: AISIN SEIKI KABUSHIKI KAISHA, Kariya (JP)

(72) Inventors: Kinji Yamamoto, Anjo (JP); Kazuya Watanabe, Anjo (JP); Itsuko Fukushima, Nagoya (JP); Tetsuya Maruoka, Okazaki (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 17/044,919

(22) PCT Filed: Mar. 25, 2019

(86) PCT No.: PCT/JP2019/012545
§ 371 (c)(1),
(2) Date: Oct. 2, 2020

(87) PCT Pub. No.: WO2019/194012
PCT Pub. Date: Oct. 10, 2019

(65) Prior Publication Data
US 2021/0160432 A1    May 27, 2021

(30) Foreign Application Priority Data

Apr. 3, 2018 (JP) .............................. JP2018-071649

(51) Int. Cl.
*H04N 5/243* (2006.01)
*H04N 5/235* (2006.01)
(Continued)

(52) U.S. Cl.
CPC ............... *H04N 5/243* (2013.01); *B60R 1/00* (2013.01); *H04N 5/2351* (2013.01);
(Continued)

(58) Field of Classification Search
None
See application file for complete search history.

(56) References Cited

U.S. PATENT DOCUMENTS

| 8,928,753 B2 | 1/2015 | Han et al. |
| 9,041,807 B2 | 5/2015 | Murakami et al. |

(Continued)

FOREIGN PATENT DOCUMENTS

| JP | 5464741 B2 | 4/2014 |
| JP | 5684144 B2 | 3/2015 |
| JP | 6115104 B2 | 4/2017 |

OTHER PUBLICATIONS

International Search Report for PCT/JP2019/012545, dated Jun. 11, 2019.

*Primary Examiner* — Peet Dhillon
(74) *Attorney, Agent, or Firm* — Sughrue Mion, PLLC

(57) ABSTRACT

An image processing device includes a hardware processor configured to: acquire items of image information; determine lateral image information as a particular state of luminance when a first region of interest exhibits luminance of a first given value or more and a difference in luminance between the first region of interest and a second region of interest is a second given value or more, the first region of interest and the second region of interest being included in a vehicular front region and a vehicular rear region of the lateral image information, respectively; set, in the particular state of luminance, a first correction value in accordance with luminance of the vehicular front region and set a second correction value in accordance with luminance of rear image information; and set, according to the first second correction values, an individual correction value for correcting luminance of a region between the first and second regions of interest.

5 Claims, 21 Drawing Sheets

(51) Int. Cl.
*H04N 5/247* (2006.01)
*H04N 5/265* (2006.01)
*B60R 1/00* (2006.01)
*H04N 7/18* (2006.01)

(52) U.S. Cl.
CPC .............. *H04N 5/247* (2013.01); *H04N 5/265* (2013.01); *H04N 7/18* (2013.01); *B60R 2300/10* (2013.01); *B60R 2300/303* (2013.01); *B60R 2300/80* (2013.01)

(56) References Cited

U.S. PATENT DOCUMENTS

| | | | |
|---|---|---|---|
| 9,598,105 B2 * | 3/2017 | Sakakibara | B62D 15/029 |
| 2006/0017807 A1 * | 1/2006 | Lee | B60R 1/00 348/36 |
| 2011/0285848 A1 | 11/2011 | Han et al. | |
| 2012/0293660 A1 | 11/2012 | Murakami et al. | |
| 2014/0132769 A1 * | 5/2014 | Kido | G06K 9/00791 348/148 |
| 2014/0160275 A1 * | 6/2014 | Sakakibara | B60R 1/00 348/118 |
| 2015/0071534 A1 * | 3/2015 | Riley | H04N 5/23238 382/167 |
| 2016/0165198 A1 * | 6/2016 | Ouchi | H04N 9/3147 348/744 |
| 2020/0351481 A1 * | 11/2020 | Kokido | B60R 1/00 |
| 2020/0365100 A1 * | 11/2020 | Matsui | G09G 5/00 |

* cited by examiner

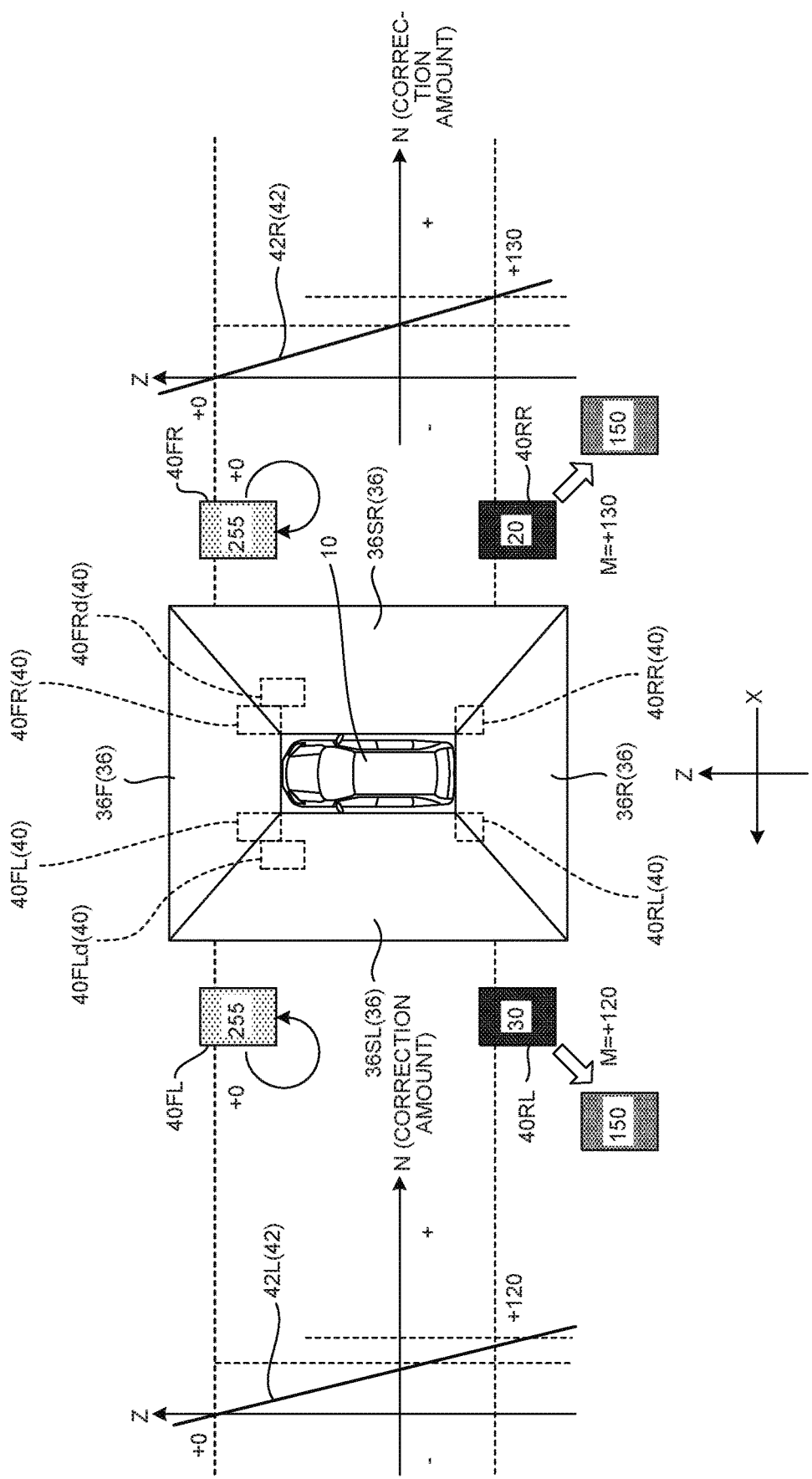

IMAGE PROCESSING DEVICE

CROSS REFERENCE TO RELATED APPLICATIONS

This application is national stage application of International Application No. PCT/JP2019/012545, filed Mar. 25, 2019, which designates the United States, incorporated herein by reference, and which claims the benefit of priority from Japanese Patent Application No. 2018-071649, filed Apr. 3, 2018, the entire contents of which are incorporated herein by reference.

TECHNICAL FIELD

An embodiment of the present invention relates to an image processing device.

BACKGROUND ART

Conventionally, image processing devices are known, which perform image processing (e.g., viewpoint conversion) to a plurality of images of a situation around a vehicle generated in different directions by a plurality of imagers (cameras) installed in a vehicle, and combine the images together to generate a peripheral image (e.g., a bird's-eye image). In such an image processing device, the images generated by the imagers may exhibit difference in brightness (luminance) depending on, for example, the installed position or imaging (shooting) direction of each imager, shooting time of day, ON or OFF of headlights, or difference in degree of diaphragm among the imagers. As a result, a peripheral image generated by combining the images may differ in brightness depending on the direction, and exhibit noticeable difference in luminance at the connected positions, which results in an unnatural image. In view of this, techniques are proposed, including correcting the luminance of the entire screen in accordance with average luminance of a plurality of images, calculating the average of luminance at four locations of a front image to adjust the luminance of the rest of the images, and correcting luminance of lateral images with the average of luminance of the front and rear images.

CITATION LIST

Patent Literature

Patent Document 1: Japanese Patent No. 5464741
Patent Document 2: Japanese Patent No. 5684144
Patent Document 3: Japanese Patent No. 6115104

SUMMARY OF INVENTION

Problem to be Solved by the Invention

However, the imagers may be individually adjusted in diaphragm (gain adjustment) at the time of imaging, as described above. Depending on the situation around the vehicle, the imaging regions of the images may greatly differ in brightness (luminance). For example, there may be street lamps or the lighting of other vehicles around the vehicle at night. In such a case the diaphragms of the imagers do not differ extremely largely. Meanwhile, the vehicle may be located alone with headlights ON in a place with no lighting at night. In such a case the entire imaging region ahead of the vehicle is sufficiently bright because of the headlights, thus, a large F-number is set, lowering the luminance of the entire image. Conversely, the lateral area of the vehicle is very dark except for the bright parts due to the headlights on the vehicular front side. As a result, the imaging regions of the lateral images appear as dark as a whole, resulting in a drop in F-number and a rise in the luminance of the entire image. As a result, the bright parts due to the influence of the headlights further rise in brightness. In the case of generating a peripheral image by combining a plurality of images together according to the average luminance in such a situation as in a conventional method, the bright parts of the front of the lateral images are corrected to be dark, resulting in deterioration in viewability of the lateral area (particularly, lateral-front region). It is thus beneficial to provide an image processing device that, to generate a peripheral image for display by combining a plurality of images, properly determines a situation around a vehicle and properly correct luminance of the image and improves viewability of image content.

Means for Solving Problem

According to one embodiment of the present invention, for example, an image processing device includes a hardware processor configured to: acquire a plurality of items of image information on situation around a vehicle captured by a plurality of imagers provided in the vehicle; determine lateral image information as a particular state of luminance when a first region of interest exhibits luminance of a first given value or more and a difference in luminance between the first region of interest and a second region of interest is a second given value or more, the lateral image information representing an image of a lateral of the vehicle, the first region of interest being included in a vehicular front region of the lateral image information, the second region of interest being included in a vehicular rear region of the lateral image information; set, after the particular state of luminance is determined, a first correction value in accordance with luminance of the vehicular front region and set a second correction value in accordance with luminance of rear image information, the first correction value for allowing the luminance of the first region of interest to match a first target luminance, the second correction value being for allowing the luminance of the second region of interest to match a second target luminance, the rear image information representing an image of a rear of the vehicle; and set, according to the first correction value and the second correction value, an individual correction value for correcting luminance of a region between the first region of interest and the second region of interest. As configured above, the image processing device can properly determine from the image that the vehicle is in the particular state of luminance such that the vehicle is located in a dark environment but the area ahead of the vehicle is particularly light (luminance of the first given value or more). As a result, the image processing device can properly correct luminance in accordance with the current situation around the vehicle and provide a peripheral image, generated by combining a plurality of images together, whose image content is easily recognizable on display.

In the image processing device of one embodiment of the present invention, for example, in setting the first correction value, the hardware processor may be further configured to set the luminance of the first region of interest as the first target luminance. As configured above, for example, the image processing device can directly use the luminance of an image generated by an imager as the first target luminance to be able to maintain the image content of the front side of the lateral image as captured. This can make the image content of a peripheral image generated by combining a plurality of images easily recognizable.

In the image processing device of one embodiment of the present invention, for example, in setting the first correction value, the hardware processor may be further configured to move the first region of interest to a peripheral region with luminance less than the first given value, to set the luminance of the peripheral region as the first target luminance. As configured above, for example, with a region having luminance higher than the first given value found in the front region of the lateral image information, the image processing device sets the first correction value in accordance with the luminance of a part around the bright region being less than the first given value. Thus, the image processing device refrains from correcting the luminance of any bright region having the first given value or more, and corrects the image of the lateral region not to become extremely dark. As a result, the image processing device can make the image content of a peripheral image generated by combining a plurality of images together easily recognizable.

In the image processing device of one embodiment of the present invention, for example, in setting the second correction value, the hardware processor may be further configured to set a given predefined target luminance as the second target luminance. As configured above, for example, in the particular state of luminance that the vehicle is located in a dark environment but the area ahead of the vehicle is particularly light, the image processing device can easily set the brightness of the area behind the vehicle and easily improve the recognition of the image content of the rear image.

In the image processing device of one embodiment of the present invention, for example, the hardware processor may be further configured to set the first region of interest in a first overlapping region and sets the second region of interest in a second overlapping region, the first overlapping region in which the vehicular front region of the lateral image information and front image information partially overlap each other, the second overlapping region in which the vehicular rear region of the lateral image information and the rear image information partially overlap each other, the front image information representing an image of a front of the vehicle. As configured above, for example, the image processing device can use the same regions of interest in common for determining whether or not the current state is the particular state of luminance and for luminance correction of a plurality of images, contributing to reducing image processing load.

BRIEF DESCRIPTION OF DRAWINGS

FIG. 24 is an exemplary schematic view illustrating correcting luminance of the situation around the vehicle in the particular state of luminance in the image processing device according to the embodiment.

DESCRIPTION OF EMBODIMENTS

The following will describe an exemplary embodiment of the present invention with reference to the accompanying drawings. Elements of an embodiment described below and actions, results, and effects attained by such elements are presented for illustrative purpose only. The present invention is attainable by elements other than those described below. The present invention can achieve at least one of various effects and derivative effects attained by the basic elements.

Figure 1:
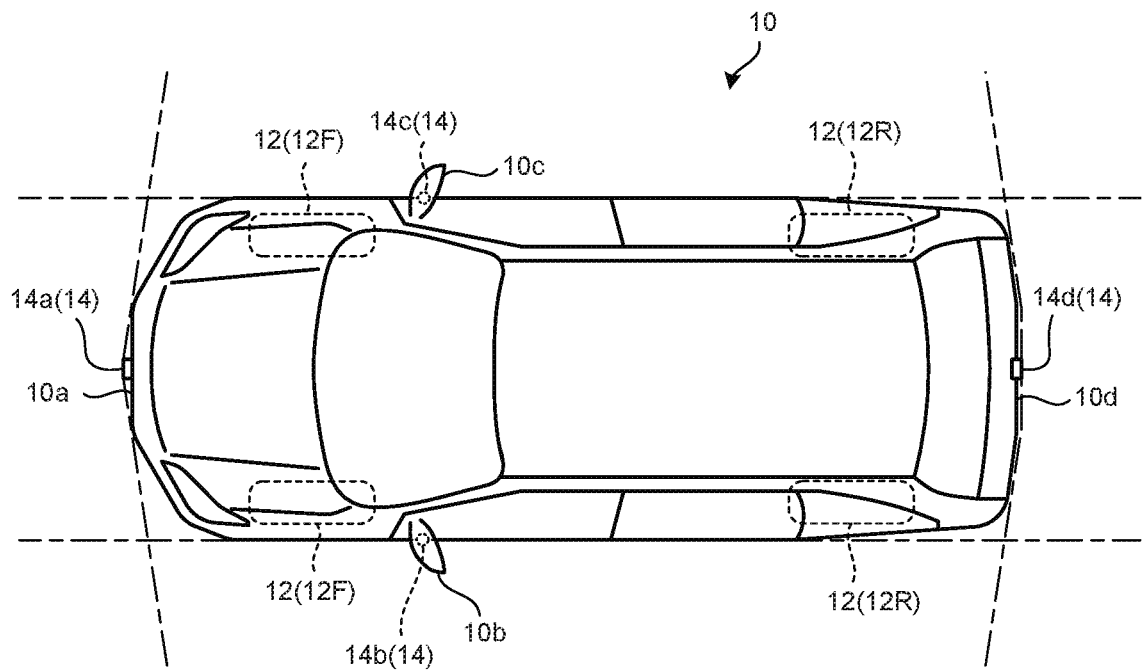
FIG. 1 is a schematic plan view of an exemplary vehicle that can be equipped with an image processing device according to an embodiment.

FIG. 1 is a schematic plan view of a vehicle 10 equipped with an image processing device according to the present embodiment. For example, the vehicle 10 may be an automobile having an internal combustion engine (engine not illustrated) as a power source (internal-combustion-engine automobile), an automobile having an electric motor (not illustrated) as a power source (e.g., an electric vehicle or a fuel cell automobile), or an automobile having both an internal combustion engine and an electric motor as a power source (hybrid automobile). The vehicle 10 can include various transmissions and can be equipped with various devices (e.g., systems, parts, and components) for driving the internal combustion engine or the electric motor. System, the number, and layout of devices involving driving wheels 12 (front wheels 12F and rear wheels 12R) of the vehicle 10 can be variously set.

As illustrated in FIG. 1, the vehicle 10 includes, for example, four imagers 14a to 14d as a plurality of imagers 14. The imagers 14 are digital cameras incorporating an image sensor, such as a charge coupled device (CCD) or a CMOS image sensor (CIS). The imagers 14 can output moving image data (image data and image information) at a given frame rate. The imagers 14 each include a wide-angle lens or a fisheye lens and can generate images in the horizontal range of 140 degrees to 220 degrees (imaging region), for example. The optical axes of the imagers 14 may be set obliquely downward. Thus, the imagers 14 successively shoot the surroundings outside the vehicle 10 including road surfaces on which the vehicle 10 is movable, marks on the road surfaces (including arrows, sectioning lines, lines indicating parking space, and traffic-lane dividing lines), and objects (e.g., pedestrians and vehicles), to output image data.

The imagers 14 are installed at the outer periphery of the vehicle 10. For example, the imager 14a is installed on the front side of the vehicle 10 in the vehicular longitudinal direction, namely, at the end in substantially the center of the vehicular width, such as at a front bumper 10a or a front grille. The imager 14a can generate a front image (front imaging region) including the front end of the vehicle 10 (e.g., the front bumper 10a). The imager 14b is, for example, installed at the left end of the vehicle 10, such as a left side mirror 10b. The imager 14b can generate a left lateral image (left lateral imaging region) including a region left lateral to the vehicle 10 (e.g., a region ranging from left front to left rear). The imager 14c is, for example, installed at the right end of the vehicle 10, such as a right side mirror 10c. The imager 14c can generate a right lateral image including a region (right lateral imaging region) right lateral to the vehicle 10 (e.g., a region ranging from right front to right rear). The imager 14d is installed on the rear side of the vehicle 10 in the vehicular longitudinal direction, namely, at the end in substantially the center of the vehicular width, such as a location above a rear bumper 10d. The imager 14d can generate a rear image (rear imaging region) including the rear end of the vehicle 10 (e.g., the rear bumper 10d).

The image processing device of the present embodiment performs computation or image processing to image data generated by the imagers 14 to generate an image having a wider viewing angle or a virtual image of the vehicle 10 viewed from above, front, or laterally (e.g., a bird's-eye image (plan image), a lateral-view image, or a front-view image). Image data (images) generated by the imagers 14 includes mutually overlapping regions to prevent missing regions in combined images. For example, the left end region of the image data in the vehicular transverse direction generated by the imager 14a overlaps with the front end region of the image data in the vehicular longitudinal direction generated by the imager 14b. The two images are subjected to a combining process (synthesis). Similarly, the front image and the right lateral image, the left lateral image and the rear image, and the rear image and the right lateral image include respective overlapping regions. The two images are subjected to a combining process (synthesis).

Figure 2:
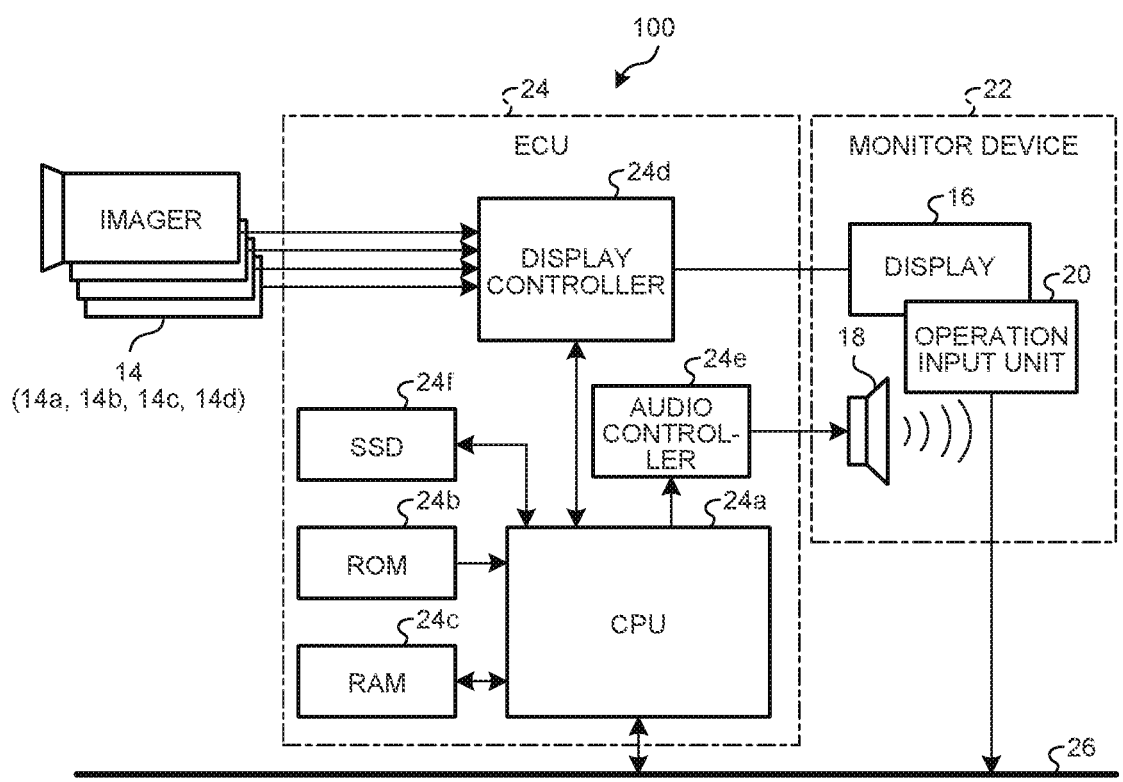
FIG. 2 is a block diagram of an exemplary configuration of an image processing system including the image processing device according to the embodiment.

FIG. 2 is a block diagram of an exemplary configuration of an image processing system 100 including the image processing device mounted in the vehicle 10. The vehicle 10 includes a display 16 and an audio output device 18 in the interior. The display 16 is, for example, a liquid crystal display (LCD) or an organic electroluminescent display (OELD). The audio output device 18 is, for example, a speaker. The display 16 is covered with a transparent operation input unit 20, such as a touch panel. An occupant (e.g., driver) can view a displayed image on the screen of the display 16 through the operation input unit 20. For operational input, the occupant touches or presses with his or her finger or moves his or her finger on the operation input unit 20 at the position corresponding to an image displayed on the screen of the display 16. For example, the display 16, the audio output device 18, and the operation input unit 20 are included in a monitor device 22 located at the center of the vehicular width, namely, the horizontal center of the dashboard of the vehicle 10. The monitor device 22 can include operational input members, such as a switch, a dial, a joystick, and a push button, not illustrated. For example, the monitor device 22 can double as a navigation system or an audio system.

As illustrated in FIG. 2, the image processing system 100 (image processing device) includes an electronic controller (ECU) 24 in addition to the imagers 14 (14a to 14d) and the monitor device 22. In the image processing system 100 (image processing device), the ECU 24 and the monitor device 22 are electrically connected to each other through an in-vehicle network 26 as an electric communication line. The in-vehicle network 26 serves as, for example, a controller area network (CAN). The ECU 24 can control various systems by transmitting control signals thereto through the in-vehicle network 26. Through the in-vehicle network 26, the ECU 24 can receive, for example, operation signals from the operation input unit 20 and the respective switches and respective detection signals from various sensors (not illustrated).

The ECU 24 receives image data from the imagers 14, generates a peripheral image from the image data, and transmits the peripheral image and audio data to the monitor device 22. The ECU 24 includes, for example, a central processing unit (CPU) 24a, a read only memory (ROM) 24b, a random access memory (RAM) 24c, a display controller 24d, an audio controller 24e, and a solid state drive (SSD) 24f including a flash memory.

Figure 3:
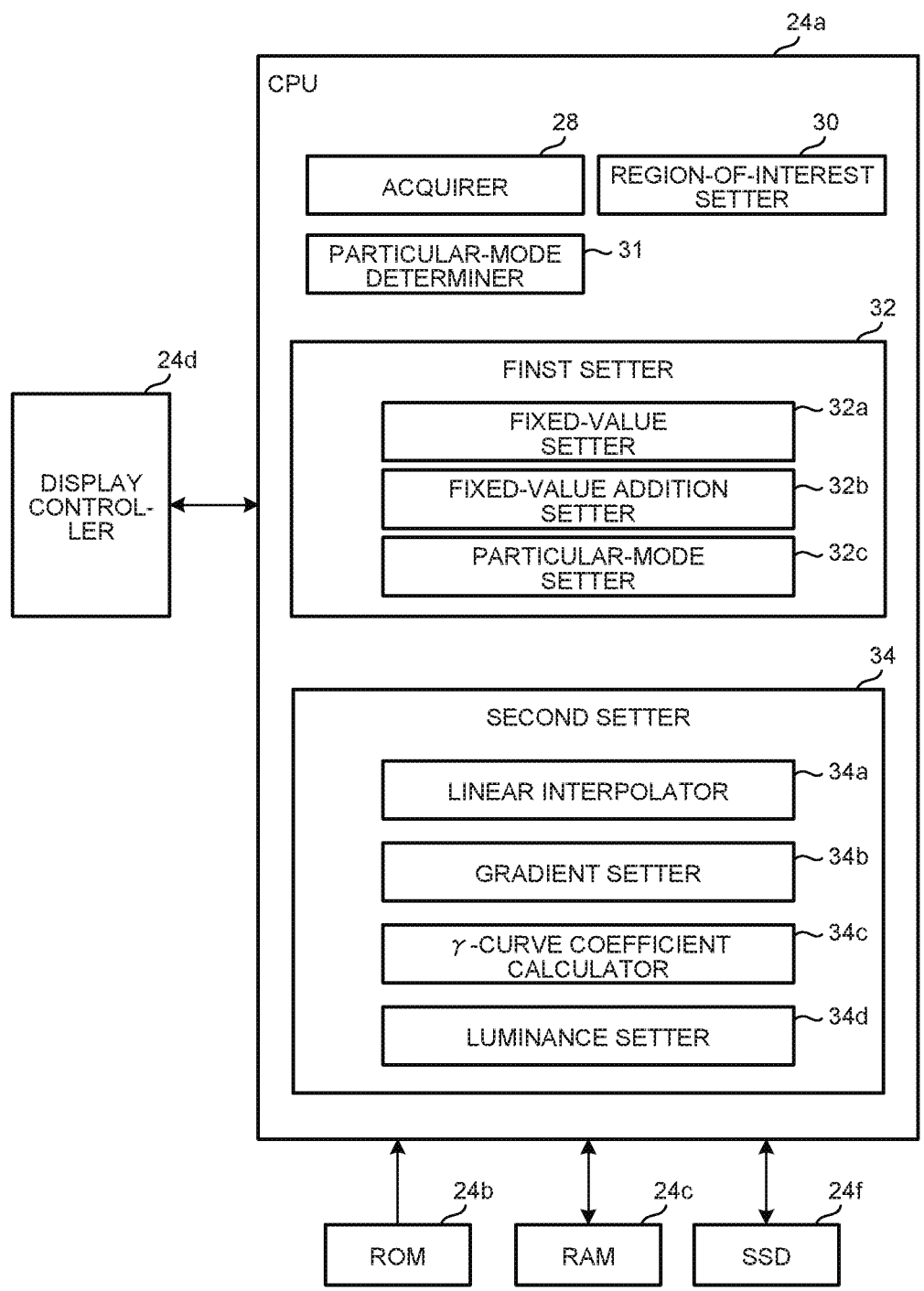
FIG. 3 is a block diagram of an exemplary configuration of a CPU of the image processing device according to the embodiment.

The CPU 24a loads a stored (installed) computer program from a non-volatile storage device, such as the ROM 24b, and performs computation by the computer program. The ROM 24b stores, for example, computer programs and parameters for execution of the computer programs. For example, the CPU 24a includes various modules as illustrated in FIG. 3 and performs processing to an image for display on the display 16. For example, the CPU 24a performs correction, computation, and image processing to the image data generated by the imagers 14 by way of example, to generate a peripheral image (e.g., a bird's-eye image) by combining a plurality of images together. The details of the CPU 24a will be described later.

The RAM 24c temporarily stores various types of data for use in computation by the CPU 24a. Of the computation by the ECU 24, the display controller 24d mainly performs image data conversion for display on the display 16, for example. Of the computation by the ECU 24, the audio controller 24e mainly process audio data to be output from the audio output device 18, for example. The SSD 24f is a rewritable non-volatile storage and can store data after power-off of the ECU 24. The CPU 24a, the ROM 24b, and the RAM 24c may be integrated in the same package. The ECU 24 may include a different arithmetic and logic processor, such as a digital signal processor (DSP), or a logic circuit instead of the CPU 24a. The ECU 24 may include a hard disk drive (HDD) instead of the SSD 24f. The SSD 24f or the HDD may be separated from the ECU 24.

According to the present embodiment, the ECU 24 controls generation of an image for display on the display 16 by cooperation between hardware and software (control program). The ECU 24 performs image processing including viewpoint conversion to the image data (images) generated by the imagers 14 and corrects the luminance of the images for display on the display 16, for example. The ECU 24 prevents the combined image of the front, rear, left, and right images from lowering in continuity due to a difference in luminance or becoming partially or entirely too light or too dark, and prevents the overall image (peripheral image or bird's-eye image generated by combining) from deteriorating in viewability.

FIG. 3 is a block diagram of an exemplary configuration of the CPU 24a included in the ECU 24 for implementing image processing in the present embodiment. FIG. 3 omits depicting elements of the CPU 24a not involving the image processing in the present embodiment. The CPU 24a includes various modules that perform image processing including luminance correction, as described above. The various modules are implemented by the CPU 24's loading and executing an installed and stored computer program from a storage, such as the ROM 24b. As illustrated in FIG. 3, for example, the CPU 24a includes an acquirer 28, a region-of-interest setter 30, a particular mode determiner 31, a first setter 32, and a second setter 34. The first setter 32 includes, for example, a fixed-value setter 32a, a fixed-value addition setter 32b, and a particular mode corrector 32c. The second setter 34 includes, for example, a linear interpolator 34a, a gradient setter 34b, a γ-curve coefficient calculator 34c, and a luminance setter 34d.

Figure 4:
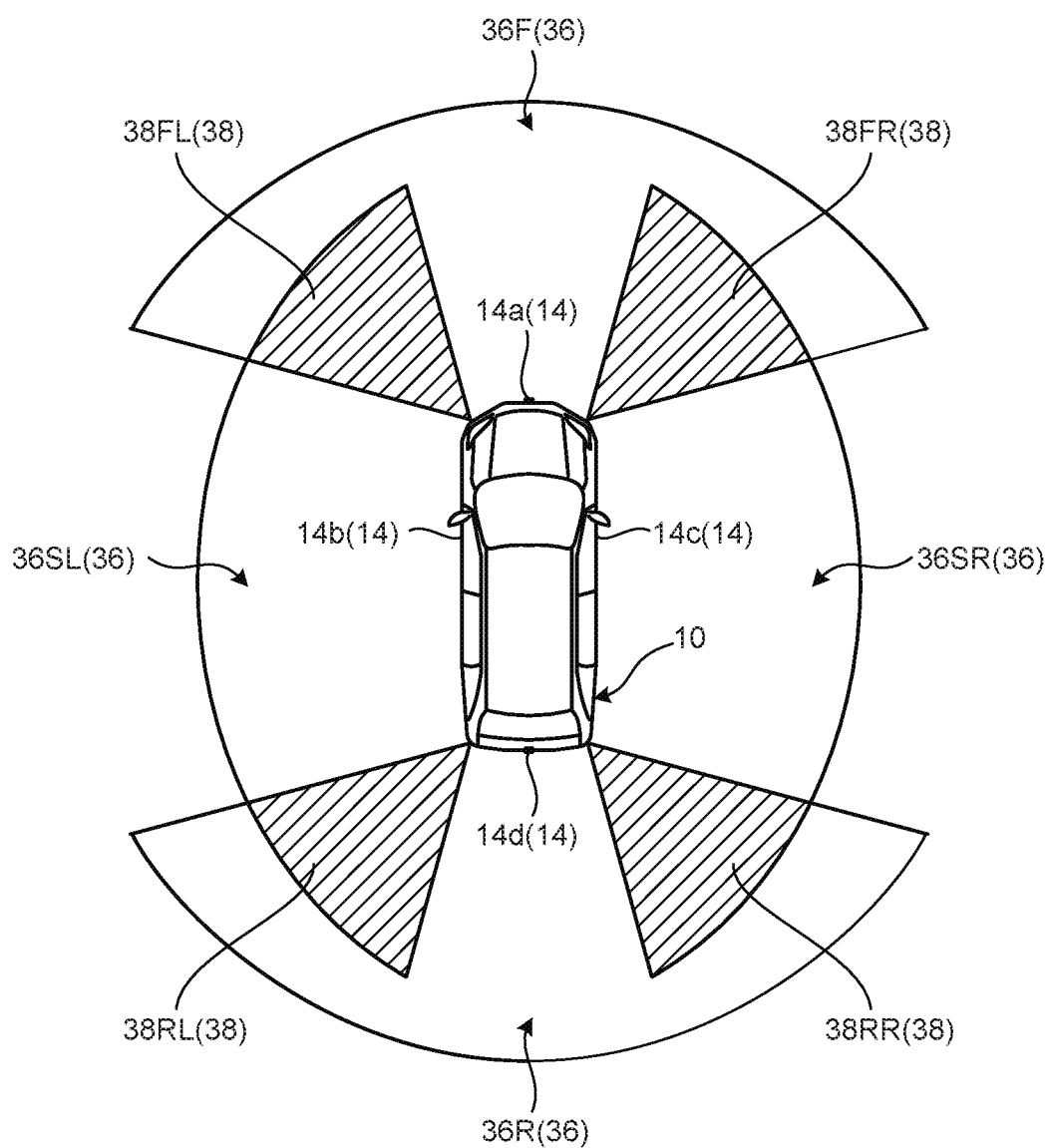
FIG. 4 is an explanatory schematic bird's eye view of respective imaging regions of imagers and the overlapping regions therebetween.

The acquirer 28 acquires images generated by the imagers 14 through the display controller 24d. The imagers 14 (14a to 14d) can capture imaging regions 36 as illustrated in FIG. 4. Each of the imaging regions 36 includes a region 38 overlapping with the adjacent imaging region 36, as described above. Among the imaging regions 36, the left side of an imaging region 36F ahead of the vehicle 10 in the vehicular transverse direction and the vehicular front side of an imaging region 36SL left lateral to the vehicle 10 form an overlapping region 38FL. Among the imaging regions 36, the vehicular rear side of an imaging region 36SL and the left side of an imaging region 36R behind the vehicle 10 in the vehicular transverse direction form an overlapping region 38RL. Among the imaging regions 36, the right side of an imaging region 36R in the vehicular transverse direction and the vehicular rear side of the imaging region 36SR right lateral to the vehicle 10 form an overlapping region 38RR. Among the imaging regions 36, the vehicular front side of the imaging region 36SR and the right side of an imaging region 36F in the vehicular transverse direction form an overlapping region 38FR. The imagers 14 may generate image data with corresponding identification codes for output to the acquirer 28. Alternatively, the acquirer 28 may add individual identification codes indicating output sources to the acquired image data.

According to the present embodiment, for example, in the processing for focusing on the imaging region 36F, one (e.g., the imaging region 36F) of a pair of imaging regions 36 (e.g., the imaging region 36F and the imaging region 36R) spaced apart across the vehicle 10 may be referred to as a first imaging region. One (e.g., the imaging region 36SL) of the pair of imaging regions 36 (e.g., the imaging region 36SL and the imaging region 36SR) adjacent to the first imaging region may be referred to as a second imaging region. The overlapping region 38 (overlapping region 38FL) between the first imaging region and the second imaging region may be referred to as a first overlapping region. Similarly, the other of the pair of imaging regions 36 (e.g., the imaging region 36SL and the imaging region 36SR) adjacent to the first imaging region may be referred to as a third imaging region (e.g., the imaging region 36SR). The overlapping region 38 (overlapping region 38FR) between the first imaging region and the third imaging region may be referred to as a second overlapping region. The pair of imaging regions 36 spaced apart across the vehicle 10 can be the imaging region 36SL and the imaging region 36SR. In this case, the second imaging region is one of the imaging region 36F and the imaging region 36R, and the third imaging region is the other.

Figure 5:
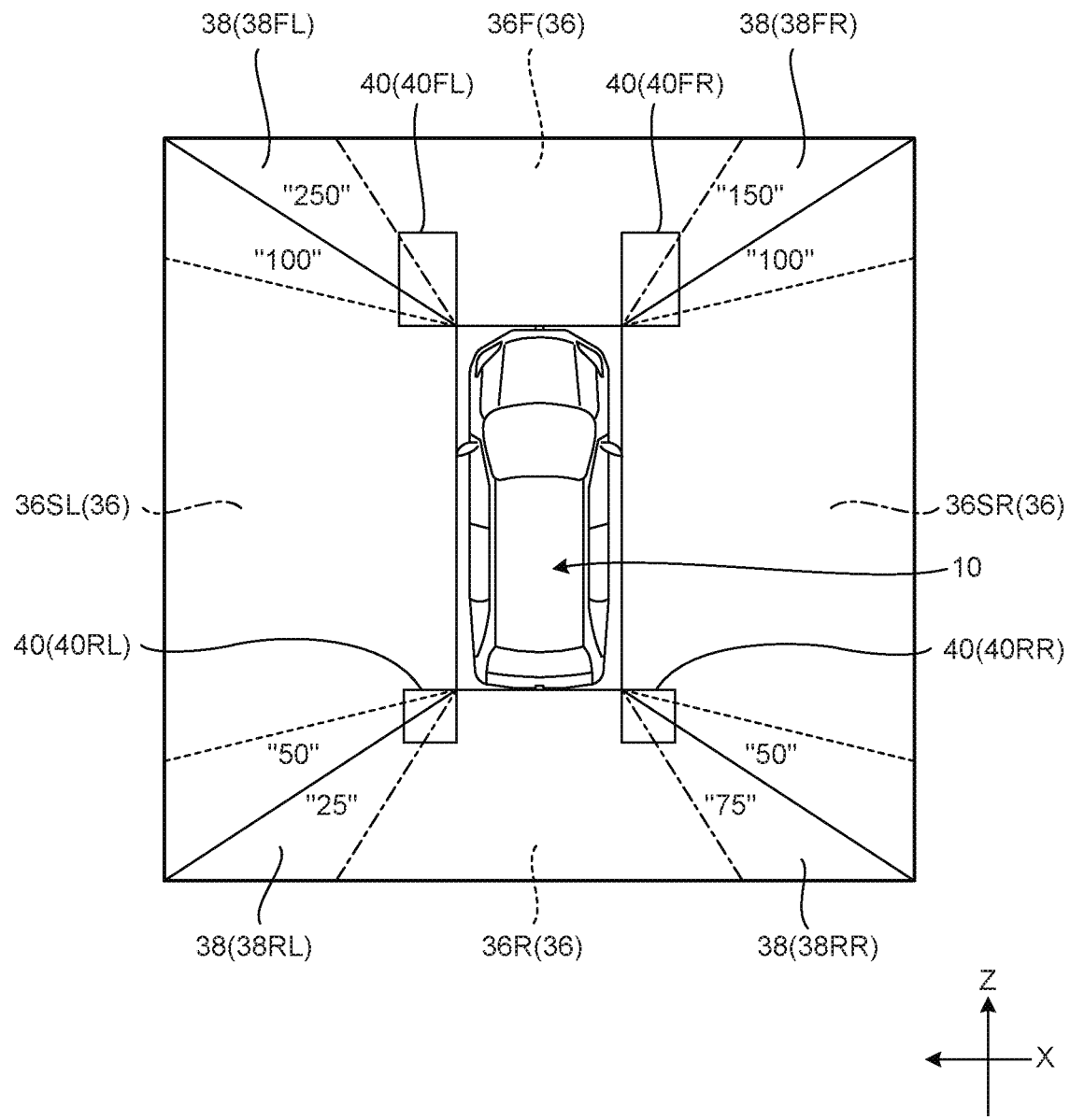
FIG. 5 is a schematic view of an exemplary luminance distribution of an original image to be processed by the image processing device and exemplary set positions of regions of interest (ROI) in the embodiment.

As illustrated in FIG. 5, the region-of-interest setter 30 sets regions of interest 40 (40FL, 40RL, 40RR, and 40FR) in each of the overlapping regions 38 of the imaging regions 36 acquired by the acquirer 28. The regions of interest 40 are to be referred to at the time of luminance adjustment. The regions of interest 40 are, for example, rectangular regions having given lengths in the transverse and longitudinal directions of the vehicle 10. The luminance of the regions of interest 40 refers to, for example, the average of luminance of pixels included in the corresponding regions of interest 40. In the present embodiment, the position of the region of interest 40 to be identified is defined to be the center of the region of interest 40 (midpoint in the vehicular transverse direction and longitudinal direction), for example.

The imagers 14 automatically adjust diaphragm (gain adjustment) for imaging, to adjust brightness (luminance adjustment) of the corresponding imaging regions 36. As a result, with respect to the imaging regions 36 including a large number of bright regions, the imagers 14 rise in F-number and generate darkish images with reduced brightness. Conversely, with respect to the imaging regions 36a including a large number of dark regions, the imagers 14 lower in F-number, and generate relatively bright images with improved brightness. Thus, as illustrated in FIG. 5, as to the region of interest 40FL in the overlapping region 38FL, for example, the part of the imaging region 36F corresponding to the region of interest 40FL and the part of the imaging region 36SL corresponding to the region of interest 40FL may differ in brightness (luminance). For example, in FIG. 5, the luminance is expressed in 256 levels of zero to 255 (zero represents dark and 255 represents light). In the region of interest 40FL of the overlapping region 38FL, the part near the imaging region 36F exhibits luminance of 250 and is bright, and the part near the imaging region 36SL exhibits luminance of 100 and is darker than the part near the imaging region 36F. In FIG. 5, the numbers such as "100" indicate luminance. In other drawings, the numbers in the regions of interest 40 may indicate luminance. The region-of-interest setter 30 may set the position of each region of interest 40 to a predefined position, or may change the set position in accordance with the luminance distribution of each imaging region 36.

The particular mode determiner 31 determines whether the state of the ambient brightness of the vehicle 10 is a normal state of luminance or a particular state of luminance. The normal state of luminance refers to the state that it is unlikely that the images exhibit a large difference in luminance thereamong. In a light environment or presence of lights such as proper illumination around the vehicle 10, for example, a large difference in luminance is unlikely to occur among the images generated by the imagers 14. For example, in the daytime, the images may exhibit a difference in luminance due to shadows, however, the images do not exhibit a large difference in luminance after diaphragm adjustment. Similarly, in an environment around the vehicle 10 with light of, for example, street lamps or the headlights of other vehicles at night, it is unlikely that a large difference in luminance occurs among the images after diaphragm adjustment. Meanwhile, the particular state of luminance refers to the state that it is likely that the images exhibit a large difference in luminance thereamong. For example, in a completely dark environment around the vehicle 10 with no light such as street lamps or lighting of other vehicles at night (e.g., in a mountain during night-time), the vehicle 10 is located alone with the headlights ON. In such a case, only the area ahead of the vehicle 10 is light and the area behind the vehicle 10 is dark, resulting in a very large difference in luminance.

The particular mode determiner 31 determines the brightness around the vehicle as the particular state of luminance when the luminance of the lateral images of the vehicle 10 (the imaging region 36SL and the imaging region 36SR) at the time of imaging satisfies at least two conditions. For example, the particular mode determiner 31 determines satisfaction of a first condition when, as to lateral image information on the lateral sides of the vehicle 10 (image information on the imaging region 36SL and the imaging region 36SR), a first region of interest (e.g., the region of interest 40FL) of the vehicular front region of lateral image information (e.g., the image information on the imaging region 36SL) exhibits luminance of a first given value (e.g., a predefined target luminance) or more. The particular mode determiner 31 determines satisfaction of a second condition when there is a difference of a second given value (e.g., luminance difference of 100) or more in luminance between a second region of interest (e.g., the region of interest 40RL) of the vehicular rear region and the first region of interest (e.g., the region of interest 40FL). After determining satisfaction of both the first condition and the second condition, the particular mode determiner 31 determines that the state of the ambient brightness of the vehicle 10 matches the particular state of luminance. Thus, upon non-satisfaction of either the first condition or the second condition, the particular mode determiner 31 determines that the state of the ambient brightness of the vehicle 10 matches the normal state of luminance. For determining whether the state of the ambient brightness of the vehicle 10 is the particular state of luminance or the normal state of luminance, the particular mode determiner 31 refers to the regions of interest 40, which are set in the overlapping regions 38 to be referred to for the luminance correction. That is, the same regions (regions of interest) are to be processed in common, thereby contributing to reducing a processing load of the image processing device. According to the present embodiment, the image processing device selects a luminance correcting method, as described later, depending on the normal state of luminance or the particular state of luminance. Control involving the particular mode determiner 31 will be described later. After the particular state of luminance is determined, however, the following vehicle may appear with the headlights ON, providing a new light, for example. In such a case the second condition is no longer satisfied, resulting in transition of luminance to the normal state of luminance. In such a case, the particular mode determiner 31 transitions to the processing corresponding to the normal state of luminance.

The first setter 32 corrects the luminance of the regions of interest 40. For example, as to the first imaging region (e.g., the imaging region 36F) of the pair of imaging regions 36 (e.g., the imaging region 36F and the imaging region 36R) spaced apart across the vehicle 10, the first setter 32 corrects the luminance of the first region of interest (e.g., the region of interest 40FL) included in the first overlapping region (e.g., the overlapping region 38FL) between the first imaging region (e.g., the imaging region 36F) and the second imaging region (e.g., the imaging region 36SL) of the pair of imaging regions 36 adjacent to the first imaging region. Similarly, the first setter 32 corrects the luminance of the second region of interest (region of interest 40FR) included in the second overlapping region (e.g., the overlapping region 38FR) between the first imaging region (e.g., the imaging region 36F) and the third imaging region (e.g., the imaging region 36SR) of the other imaging region 36 adjacent to the first imaging region. In the same manner, the first setter 32 corrects the luminance of the region of interest 40RL and the luminance of the region of interest 40RR.

According to the present embodiment, the first setter 32 can correct the luminance of the regions of interest 40 by two or more methods. For example, the fixed-value setter 32a sets a correction value for allowing the luminance to be a predefined target luminance of a given value, and corrects the luminance with the correction value. The target luminance (e.g., 200 in 256 levels) is derived in advance through experiment, for example, and serves as optimal viewability regardless of in dark or light environment. The fixed-value setter 32a corrects luminance with a correction value for allowing the luminance of each region of interest 40 to match the target luminance.

After calculating the target luminance for correcting the luminance of each region of interest 40 of the imaging regions 36, the fixed-value addition setter 32b of the first setter 32 adds a predefined given adjusted value to the target luminance to uniformly correct the luminance of the imaging regions 36 to rise. For example, If, as to the imaging region 36F, the left-side region of interest 40FL exhibits luminance of 150 and the right-side region of interest 40FR exhibits luminance of 100 in the vehicular transverse direction, the fixed-value addition setter 32b sets the target luminance according to at least either of the luminances. For example, the average luminance of 125 of the region of interest 40FL and the region of interest 40FR is set to the target luminance. After determining that the brightness of the entire imaging region 36F after corrected with the target luminance is insufficient, the fixed-value addition setter 32b adds a given adjusted value predefined. For example, the fixed-value addition setter 32b adds the luminance adjustment value of 50, which is defined in advance by experiment, to uniformly correct the brightness of the entire imaging region 36F to rise.

After the particular mode determiner 31 determines that the state of the ambient brightness of the vehicle 10 matches the particular state of luminance, the particular mode corrector 32c of the first setter 32 sets the target luminance of the lateral images for luminance correction by a different method from the fixed-value setter 32a and the fixed-value addition setter 32b. Under the ambient brightness of the vehicle 10 in the particular state of luminance, the particular mode corrector 32c sets a first correction value and a second correction value by different methods. The first correction value serves as allowing the luminance of the first region of interest (e.g., the region of interest 40FL) in the vehicular front region of either lateral image to match a first target luminance. The second correction value serves as allowing the luminance of the second region of interest (e.g., the region of interest 40RL) in the vehicular rear region to match a second target luminance. For example, the particular mode corrector 32c sets the first correction value in accordance with the luminance of the vehicular front region. As an example, the particular mode corrector 32c sets the current luminance of the first region of interest as the first target luminance, to decide the first correction value. As another example, the particular mode corrector 32c moves the first region of interest to a region, around the first region of interest, with luminance less than the first given value (e.g., predefined target luminance) and sets the luminance of the region as the first target luminance, to decide the first correction value. The particular mode corrector 32c sets the second correction value in accordance with the luminance of rear image information on the area behind the vehicle 10 (image information on the imaging region 36R).

Examples of correction by the fixed-value setter 32a, the fixed-value addition setter 32b, and the particular mode corrector 32c will be described later.

The second setter 34 sets the luminance of a region between adjacent regions of interest 40 in accordance with the respective correction values. When the left-side region of interest 40FL in the vehicle transverse direction of the imaging region 36F is set to the first region of interest, for example, the second setter 34 sets, as the first correction value, the correction value for correcting the luminance to the fixed target luminance by the fixed-value setter 32a. Similarly, when the right-side region of interest 40FR of the imaging region 36F in the vehicular transverse direction is set to the second region of interest, for example, the second setter 34 sets, as the second correction value, the correction value for correcting the luminance to the fixed target luminance by the fixed-value setter 32a. In this case, from the first correction value and the second correction value, the linear interpolator 34a generates, for example, a straight-line interpolation formula (straight line connecting the first correction value and the second correction value) for linear interpolation. Then, the region between the two regions of interest 40 is corrected in luminance by the generated linear interpolation formula (e.g., straight-line interpolation formula).

The gradient setter 34b corrects the gradient of the linear interpolation formula generated by the linear interpolator 34a when the gradient is a given limit value or more. For example, when one of the adjacent regions of interest 40 exhibits luminance greatly different from the target luminance set by the fixed-value setter 32a, the linear interpolator 34a generates a linear interpolation formula with a large gradient. As a result, around the region of interest 40, for example, a part darker than the region of interest 40 may be corrected more brightly due to the influence of the corrected luminance of the region of interest 40. This results in luminance correction that causes higher luminance than necessary, which may lead to occurrence of highlights clipping. The gradient setter 34b corrects the gradient of the linear interpolation formula generated by the linear interpolator 34a by a pre-set curve. The curve has, for example, characteristics not to correct the gradient of the linear interpolation formula being smaller than a limit value and to decrease the gradient of a given value or more. The curve may have characteristics to correct the gradient being a threshold limit value or more exceeding the limit value to a pre-set given value (fixed value).

As one example, the linear interpolator 34a generates a linear interpolation formula by linearly connecting the respective correction values of two adjacent regions of interest 40. In this case, in the intermediate part of the image, shadows clipping may occur due to a too small correction amount of the luminance correction, while highlights clipping may occur in the image due to a too large correction amount. In view of this, the γ-curve coefficient calculator 34c calculates a first coefficient for a first γ curve, which is calculated as a curve formula for the first target luminance of the luminance of the first region of interest (e.g., the region of interest 40FL). Similarly, the γ-curve coefficient calculator 34c calculates a second coefficient for a second γ curve, which is calculated as a curve formula for the second target luminance of the second region of interest (e.g., the region of interest 40FR). The γ-curve coefficient calculator 34c generates a linear interpolation formula based on the calculated first coefficient and second coefficient, and sets the luminance of the region between the first region of interest and the second region of interest, in accordance with a correction value (γ-curve coefficient) calculated by the linear interpolation formula. In this case, the γ curve formulas represent curves constantly including the minimum luminance value of zero and the maximum luminance value of 255 in 256 levels of luminance. Thus, the use of the γ curve coefficients makes it possible to prevent occurrence of shadows clipping (too dark as a result of correction) or highlights clipping (too light as a result of correction) in the image. This results in reducing missing information such as shadows clipping or highlights clipping, enabling generation of recognizable peripheral images.

The luminance setter 34d sets an individual correction value for the luminance of the region between the first region of interest (e.g., the region of interest 40FL) and the second region of interest (e.g., the region of interest 40FR) by the linear interpolation formula generated by the linear interpolator 34a. By the linear interpolation formula generated by the linear interpolator 34a for the imaging region 36F ahead of the vehicle 10, the luminance setter 34d similarly corrects the luminance of the regions ahead and behind the vehicle in the imaging region 36F. That is, as to the imaging region 36F, the regions ahead and behind the vehicle are subjected to luminance correction with a similar correction value (correction amount).

The configuration of the CPU 24a in FIG. 3 is exemplary. Thus, for example, the first setter 32 may select either of the corrections with given values (by the fixed-value setter 32a and the fixed-value addition setter 32b). In the case of constantly using one of the fixed-value setter 32a and the fixed-value addition setter 32b, the CPU 24a may exclude the other. If the linear interpolator 34a of the second setter 34 generates a linear interpolation formula from the correction values of regions of interest 40 alone, the CPU 24a may exclude the γ-curve coefficient calculator 34c.

Exemplary processing of the image processing system 100 (image processing device) as configured above will be described with FIGS. 7 to 16 and the flowchart of FIG. 6 and FIGS. 1 to 5.

With reference to the flowchart of FIG. 6, luminance correction in the normal state of luminance will be described first. Namely, while the images generated by the imagers 14 are unlikely to exhibit a large difference in luminance, the fixed-value setter 32a sets a pre-set target luminance as a given value.

First, the CPU 24a determines whether now is the time to generate a bird's eye image around the vehicle 10 (S100). The CPU 24a makes an affirmative determination, for example, in response to the operational state of the vehicle 10 (e.g., the shift lever shifted to reverse) or a driver's operation for a display request through the operation input unit 20. After the CPU 24a determines generation of a peripheral image (Yes in S100), the acquirer 28 acquires images (image information) of the imaging regions 36 generated by the imagers 14 (S102). Upon determining that now is not the time to generate a peripheral image (No in S100), the CPU 24a temporarily ends the flow of FIG. 6.

Figure 7:
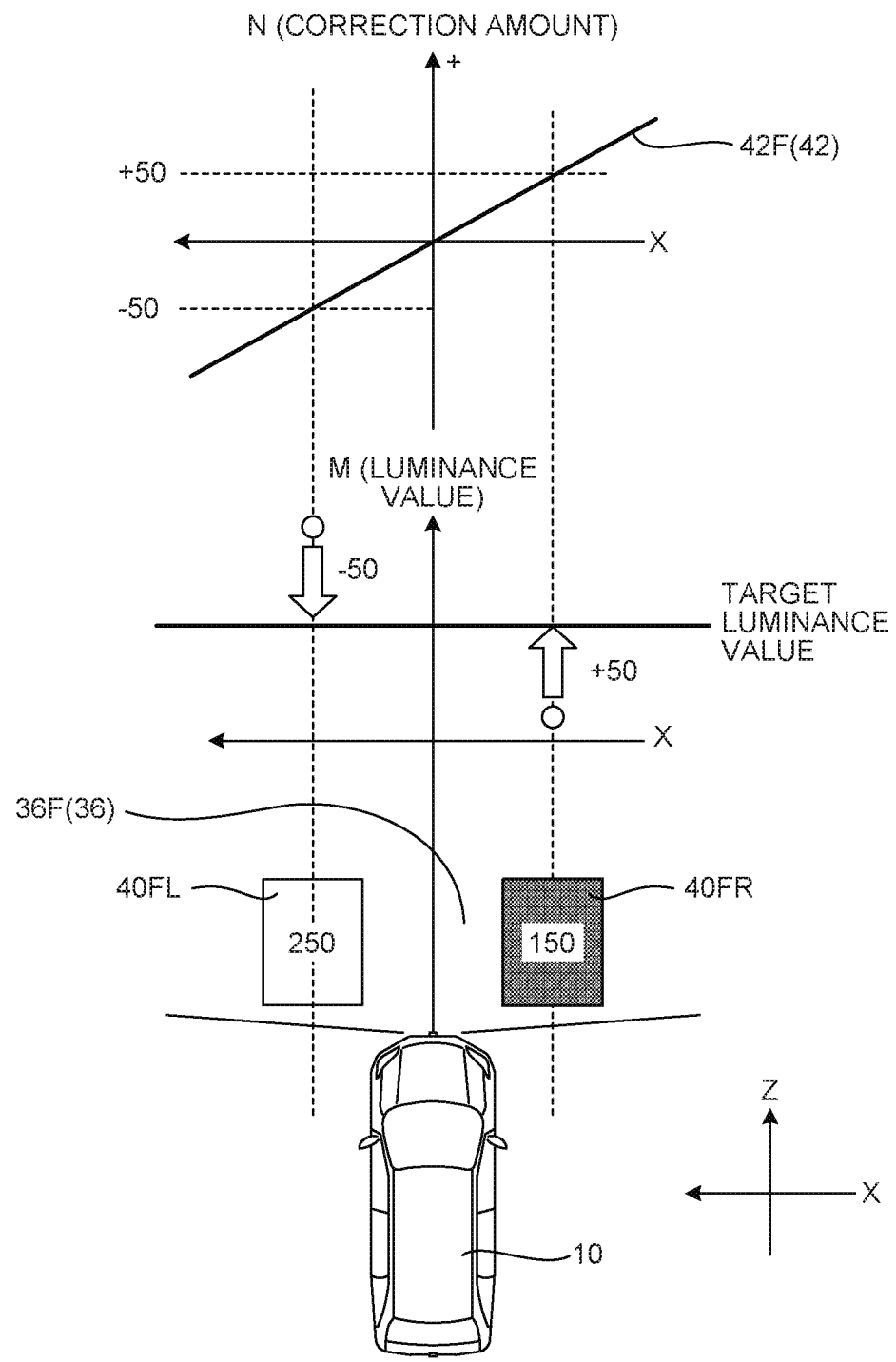
FIG. 7 is an explanatory and schematic view illustrating exemplary partial processing of the image processing device, i.e., correcting to the fixed target luminance the luminance of each region of interest in the imaging region ahead of the vehicle and a linear interpolation formula corresponding to the correction in the embodiment.
Figure 8:
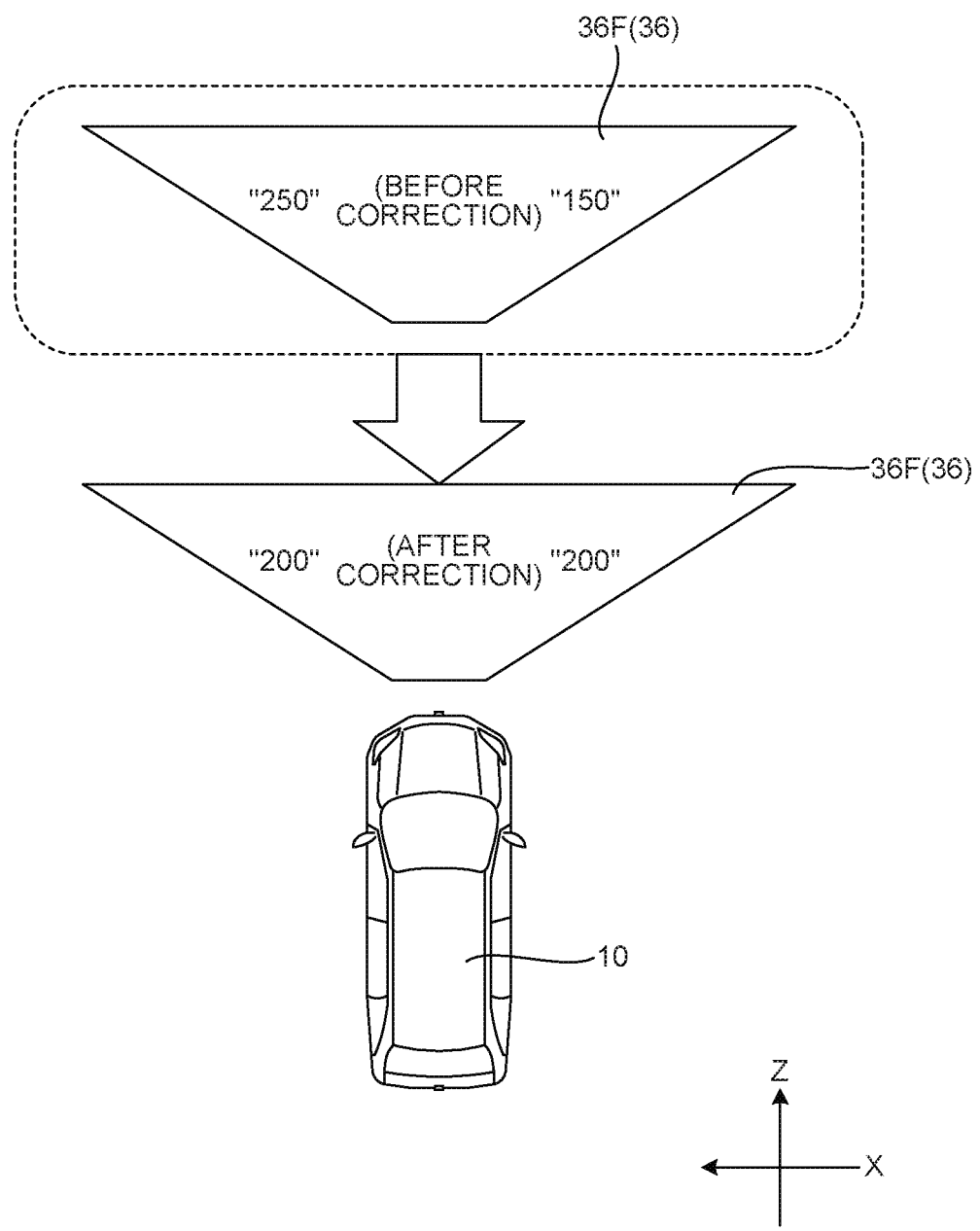
FIG. 8 is an explanatory and schematic view illustrating luminance correction using the luminance set by the linear interpolation formula in FIG. 7 and an exemplary variation in the state of luminance before and after correction of the imaging region ahead of the vehicle.

Subsequently, the region-of-interest setter 30 sets regions of interest 40 in the imaging region 36 of each acquired image (S104). In the case of the regions of interest 40 of the imaging regions 36 exhibiting the luminance as illustrated in FIG. 5, for example, the fixed-value setter 32a sets the target luminance of a given value (e.g., 200 in 256 levels) to each region of interest 40 (S106), and sets a correction value serving to correct the luminance of each region of interest 40 to the target luminance (e.g., 200) (S108). FIG. 7 illustrates exemplary correction of the luminance of the imaging region 36F ahead of the vehicle 10. In the imaging region 36F in the vehicular transverse direction (X-axis direction), the luminance of the left-side region of interest 40FL is 250 in 256 levels and the luminance of the right-side region of interest 40FR is 150 in 256 levels, by way of example. Meanwhile, in the case of the target luminance of 200 in 256 levels, set by the fixed-value setter 32a, a correction value of −50 as a luminance value M is set to the region of interest 40FL of the imaging region 36F while a correction value of +50 is set to the region of interest 40FR The linear interpolator 34a generates a linear interpolation formula 42 (42F) using the correction value (N=−50) of the region of interest 40FL and the correction value (N=+50) of the region of interest 40FR set by the first setter 32 (S110). As a result, the luminance correction amount for the region between the region of interest 40FL and the region of interest 40FR in the vehicular transverse direction (X-axis direction) is represented by the linear interpolation formula 42F. Then, the luminance setter 34d corrects (sets) the luminance of the region between the region of interest 40FL and the region of interest 40FR with the correction value (individual correction value) calculated by the generated linear interpolation formula 42F. Similarly, the luminance setter 34d corrects (sets) the luminance of the region of the imaging region 36F in the vehicular longitudinal direction (Z-axis direction) with a similar correction value (S112). As a result, as illustrated in FIG. 8, the left side (the region of interest 40FL) of the imaging region 36F in the vehicular transverse direction is corrected in luminance to fall from 250 to 200, for example. The right side thereof (the region of interest 40FR) in the vehicular transverse direction is corrected in luminance to rise from 150 to 200, for example.

The CPU 24a monitors the entire screen to determine whether or not the above correction process has been completed (S114). After determining incompletion of the correction process (No in S114), the CPU 24a returns to S104. The CPU 24a causes the region-of-interest setter 30, the first setter 32, and the second setter 34 to perform the above processing to the imaging region 36R, the imaging region 36SL, and the imaging region 36SR.

For example, the region-of-interest setter 30, the first setter 32, and the second setter 34 perform processing to the imaging region 36R behind the vehicle 10 in the same manner as above. As a result, in the imaging region 36R in the vehicular transverse direction, the left side (the region of interest 40RL) is corrected in luminance to rise from 50 to 200 and the right side (the region of interest 40RR) is corrected in luminance to rise from 50 to 200.

Figure 9:
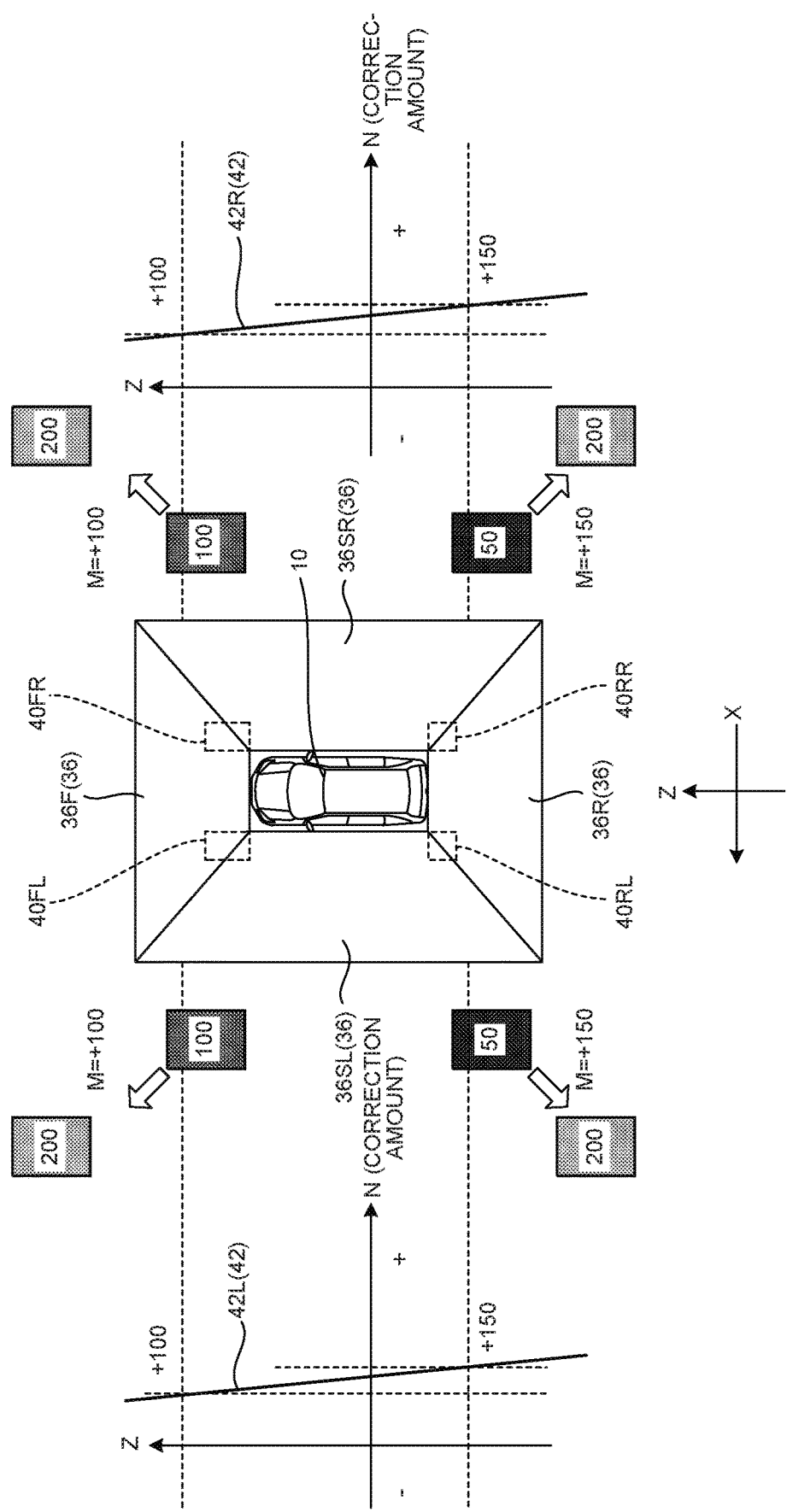
FIG. 9 is an explanatory and schematic view illustrating exemplary partial processing of the image processing device, i.e., correcting to the fixed target luminance the luminance of the regions of interest of each imaging region lateral to the vehicle, and a linear interpolation formula corresponding to the correction in the embodiment.

Similarly, as illustrated in FIG. 9, the region-of-interest setter 30, the first setter 32, and the second setter 34 perform the processing to the imaging region 36SL and the imaging region 36SR left and right lateral to the vehicle 10 in the same manner. In the imaging region 36SL in the vehicular longitudinal direction (Z-axis direction), for example, the front-side region of interest 40FL exhibits luminance of 100 in 256 levels, and the rear-side region of interest 40RL exhibits luminance of 50 in 256 levels. Meanwhile, with the target luminance of 200 in 256 levels set by the fixed-value setter 32a, the first setter 32 sets a correction value of +100 as a luminance value M to the region of interest 40FL and sets a correction value of +150 as a luminance value M to the rear-side region of interest 40RL. The linear interpolator 34a generates a linear interpolation formula 42L using the correction value (N=+100) for the region of interest 40FL and the correction value (N=+150) for the region of interest 40RL set by the first setter 32. Similarly, in the imaging region 36SR in the vehicular longitudinal direction (Z-axis direction), the front-side region of interest 40FR exhibits luminance of 100 in 256 levels and the rear-side region of interest 40RR exhibits luminance of 50 in 256 levels. Meanwhile, with the target luminance of 200 in 256 levels set by the fixed-value setter 32a, the first setter 32 sets a correction value of +100 as a luminance value M to the region of interest 40FR and sets a correction value of +150 as a luminance value M to the rear-side region of interest 40RR. The linear interpolator 34a generates a linear interpolation formula 42R using the correction value (N=+100) for the region of interest 40FR and the correction value (N=+150) for the region of interest 40RR set by the first setter 32.

Thus, the luminance correction amount for the region between the region of interest 40FL and the region of interest 40RL of the imaging region 36SL in the vehicular longitudinal direction (Z-axis direction) is represented by the linear interpolation formula 42L. The individual luminance correction amount for the region between the region of interest 40FR and the region of interest 40RR of the imaging region 36SR in the vehicular longitudinal direction (Z-axis direction) is represented by the linear interpolation formula 42R. By the linear interpolation formula 42L, the luminance setter 34d corrects the luminance of the region between the region of interest 40FL and the region of interest 40RL and the luminance of the region of the imaging region 36SL in the vehicular transverse direction (X-axis direction) with similar individual correction amounts. By the linear interpolation formula 42R, the luminance setter 34d corrects the luminance of the region between the region of interest 40FR and the region of interest 40RR and the luminance of the region of the imaging region 36SR in the vehicular transverse direction (X-axis direction) with similar individual correction amounts.

Figure 10:
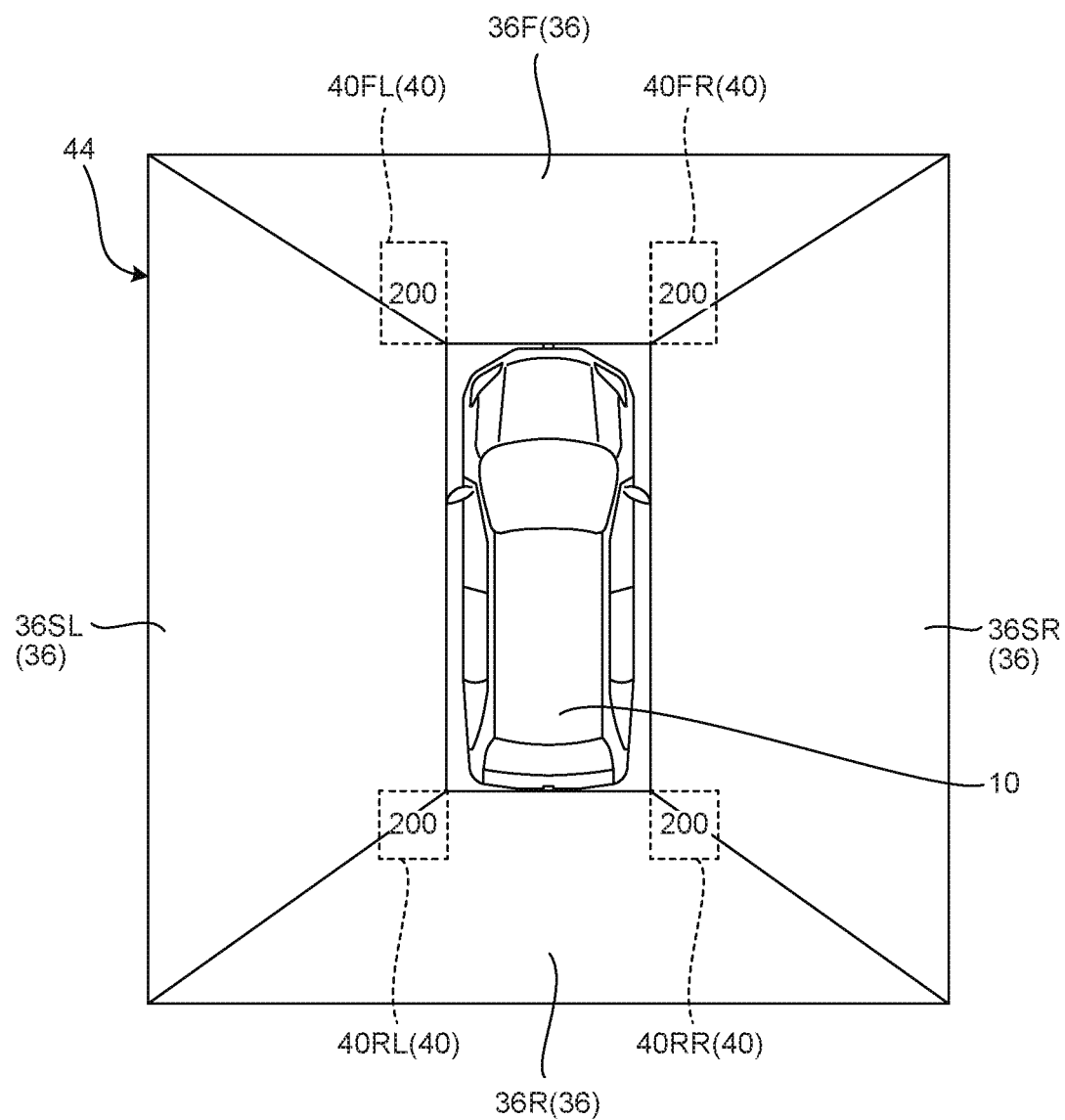
FIG. 10 is a schematic view illustrating an exemplary state of luminance of a peripheral image generated after luminance correction to the imaging regions around the vehicle.

After completing the correction process to all the images (images of the imaging region 36F, the imaging region 36R, the imaging region 36SL, and the imaging region 36SR) (Yes in S114), the CPU 24a causes the display controller 24d to generate a bird's-eye peripheral image by combining the images together for display on the display 16 (S116). The CPU 24a repeats the processing from S100 in the next processing cycle, to update the peripheral image. In this case, as illustrated in FIG. 10, the regions of interest 40 (40FL, 40RL, 40RR, and 40FR) exhibit luminance of 200 in 256 levels, so that a peripheral image 44 of the smoothly combined imaging regions 36 (36F, 36SL, 36R, and 36SR) can be generated. Further, the respective regions between the regions of interest 40 are corrected in luminance by the corresponding linear interpolation formulas 42, which can prevent generation of the image containing too light or too dark parts and makes it easier to recognize the content of the peripheral image 44 in any part of the image.

Figure 11:
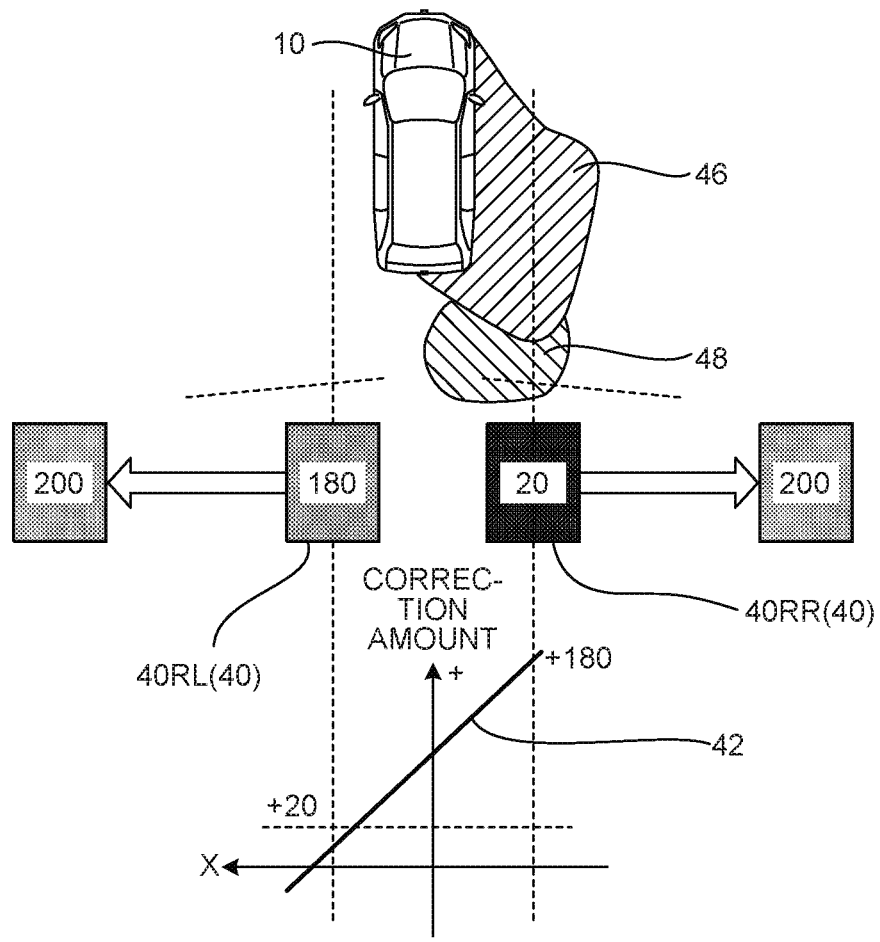
FIG. 11 is an exemplary schematic view of an extremely large gradient of a linear interpolation formula for use in luminance correction of the image processing device in the embodiment.
Figure 12:
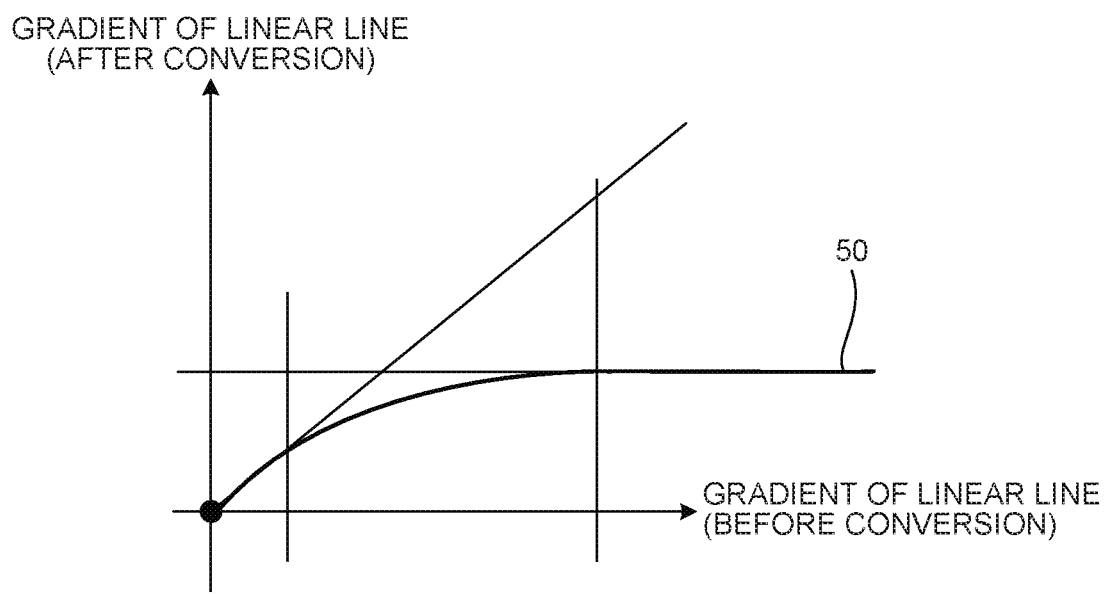
FIG. 12 is an exemplary schematic view illustrating correction of the gradient of the linear interpolation formula in FIG. 11.

Adjacent regions of interest 40 may initially exhibit a large difference in luminance. As illustrated in FIG. 11, for example, under strong sunlight outdoors, a dark shadow 46 of the vehicle may appear partly around the vehicle 10. In this case, a large difference in luminance may occur between the region of interest 40RL outside the shadow 46 (e.g., 180 in 256 levels) and the region of interest 40RR covered with the shadow 46 (e.g., 20 in 256 levels). In such a case, the fixed-value setter 32a sets the target luminance to 200 as in the example described above, which results in the correction value of +20 for the region of interest 40RL and the correction value of +180 for the region of interest 40RR. That is, as illustrated in FIG. 11, a linear interpolation formula 42 generated by the linear interpolator 34a may have a large gradient. In this case, in the vicinity of the region of interest 40RR, a region 48 brighter than the region of interest 40RR may be corrected to higher luminance due to the influence of the corrected luminance of the region of interest 40RR. This may result in highlights clipping in the region 48 brighter than the region of interest 40RR. Thus, the gradient setter 34b corrects the gradient of the linear interpolation formula 42 generated by the linear interpolator 34a by a pre-set curve 50 as illustrated in FIG. 12. For example, this curve 50 serves not to correct the gradient of the linear interpolation formula 42 being less than a given limit value in a normal zone. The curve 50 serves to correct the gradient of the given limit value or more in a limit zone to decrease the gradient. The curve 50 serves to correct the gradient being a given threshold limit value or more exceeding the limit value to a pre-set given value (fixed value).

Correcting the gradient of the linear interpolation formula 42 having the given limit value or more with the curve 50 makes it possible to reduce luminance correction to the region 48 brighter than the region of interest 40RR and avoid occurrence of highlights clipping. Correcting the gradient with the threshold limit value (fixed value) enables no further increase in the luminance. In this case, the image is supposed to be corrected to higher luminance to smoothly vary in luminance but instead is subjected to limited correction, so that the variation in luminance becomes less smooth. However, highlights clipping can be prevented, contributing to improving the viewability of image content. The shape of the curve 50, the limit value, and the threshold limit value (fixed value) can be appropriately set in advance by experiment in consideration of balance with the ambient luminance, for example. The linear interpolator 34a may calculate the curve 50 in consideration of the balance with the ambient luminance, for example.

Figure 13:
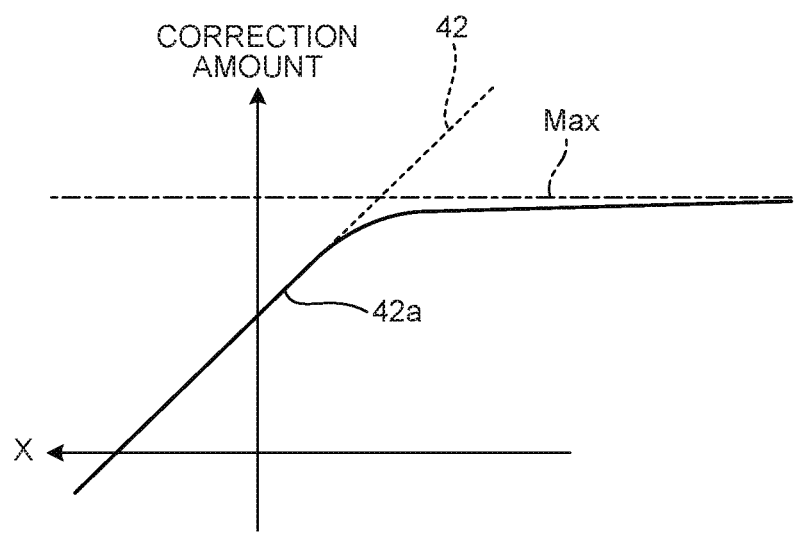
FIG. 13 is an exemplary schematic view illustrating limiting an extremely large correction amount to an upper-limit correction value in luminance correction of the image processing device according to the embodiment.

According to another embodiment, the luminance setter 34d may apply a limitation to a correction value (individual correction value) set for the luminance of the region between the region of interest 40RL and the region of interest 40RR by the linear interpolation formula 42. For example, as illustrated in FIG. 13, the luminance setter 34d sets an upper-limit correction value Max to the correction value to allow the individual correction amount to fall below the upper-limit correction value Max as the correction amount of the luminance increases, following the linear interpolation formula 42. In this case, it is possible to reduce luminance correction of the region 48 brighter than the region of interest 40RR, to be able to prevent occurrence of highlights clipping. The upper-limit correction value Max may be set in advance to a fixed value or may be set in accordance with the gradient of the calculated linear interpolation formula 42.

As described above, the linear interpolation formula 42 is generated by linearly connecting the correction values of two adjacent regions of interest 40 on the basis of the target luminance set by the fixed-value setter 32a. This can advantageously correct the luminance with no increase in processing load. Meanwhile, in the intermediate part of the image, shadows clipping may occur due to a too small correction amount in the luminance correction, while highlights clipping may occur in the image due to a too large correction amount. Thus, according to the present embodiment, γ-correction may be applied to luminance correction. For example, the region of interest 40FL (first region of interest) and the region of interest 40FR (second region of interest) in the imaging region 36F ahead of the vehicle 10 are considered. The region of interest 40FL exhibits luminance (average luminance in the region) of 150 in 256 levels, and the region of interest 40FR exhibits luminance of 100. The target luminance is set to 125 in 256 levels by the fixed-value setter 32a. In this case, to correct the luminance to the target luminance, the region of interest 40FL requires a correction value of −25 and the region of interest 40FR requires a correction value of +25.

Figure 14:
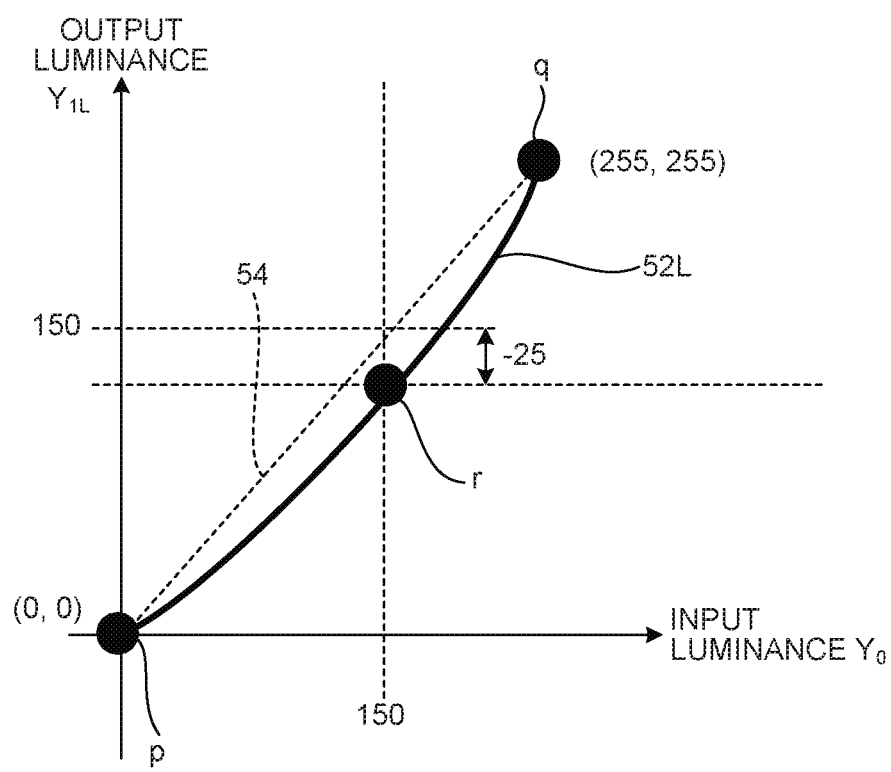
FIG. 14 is an exemplary schematic view illustrating a relationship between input luminance and output luminance in the case of a linear interpolation of luminance with a γ-curve coefficient.
Figure 15:
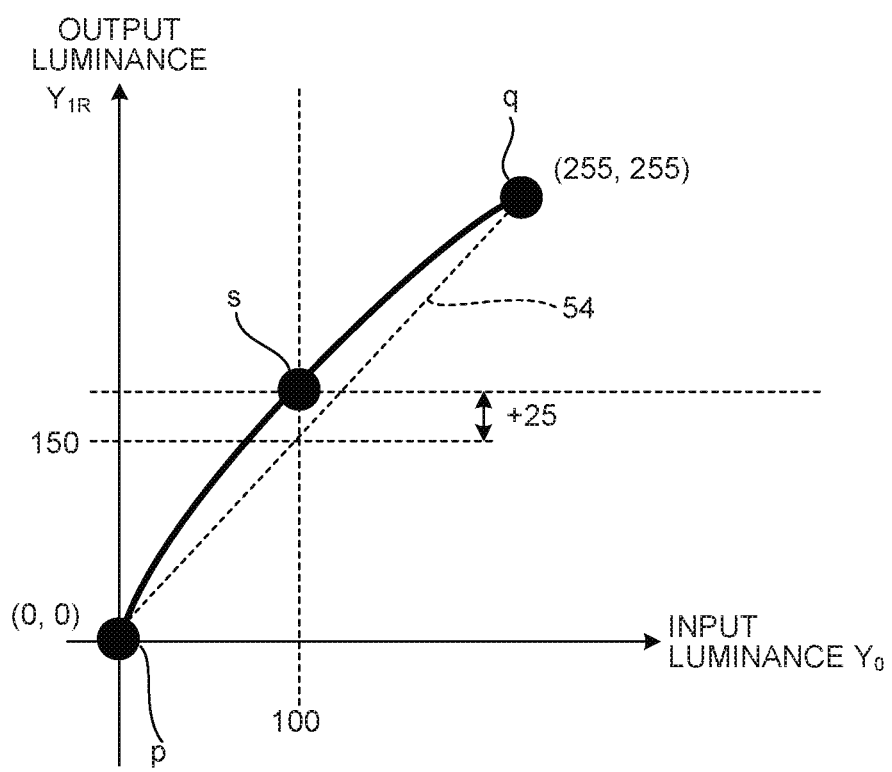
FIG. 15 is an exemplary schematic view illustrating another relationship between input luminance and output luminance in the case of a linear interpolation in luminance with a γ-curve coefficient.

In view of this, as illustrated in FIG. 14, the γ-curve coefficient calculator 34c calculates, for the region of interest 40FL, a first γ curve 52L with the horizontal axis indicating input luminance $Y_0$ and the vertical axis indicating output luminance $Y_{1L}$. In this case, the γ-curve coefficient calculator 34c calculates, as the first γ curve 52L, a curve ($Y_{1L}=Y_0^{1/\gamma 1}$) passing through three points at the coordinates p=(0, 0) of the minimum value (minimum luminance), the coordinates q=(255, 255) of the maximum value (maximum luminance), and the coordinates r at which the output luminance $Y_{1L}$ relative to the input luminance Y0 becomes −25. The γ-curve coefficient calculator 34c calculates a first coefficient being γ1. In this case, the first γ curve 52L is a downward convex curve relative to a straight line 54 that satisfies the equation: the output luminance $Y_{1L}$=the input luminance $Y_0$. Similarly, as illustrated in FIG. 15, the γ-curve coefficient calculator 34c calculates, as a second γ curve 52R for the region of interest 40FR, a curve ($Y_{1R}=Y_0^{1/\gamma 2}$) passing through three points at the coordinates p=(0, 0) of the minimum value (minimum luminance), the coordinates q=(255, 255) of the maximum value (maximum luminance), and the coordinates r at which the output luminance $Y_{1R}$ relative to the input luminance $Y_0$ becomes +25. The γ-curve coefficient calculator 34c calculates a second coefficient being γ2. In this case, the second γ curve 52R is an upward convex curve relative to the straight line 54 that satisfies the equation: the output luminance $Y_{1R}$=the input luminance $Y_0$.

Figure 16:
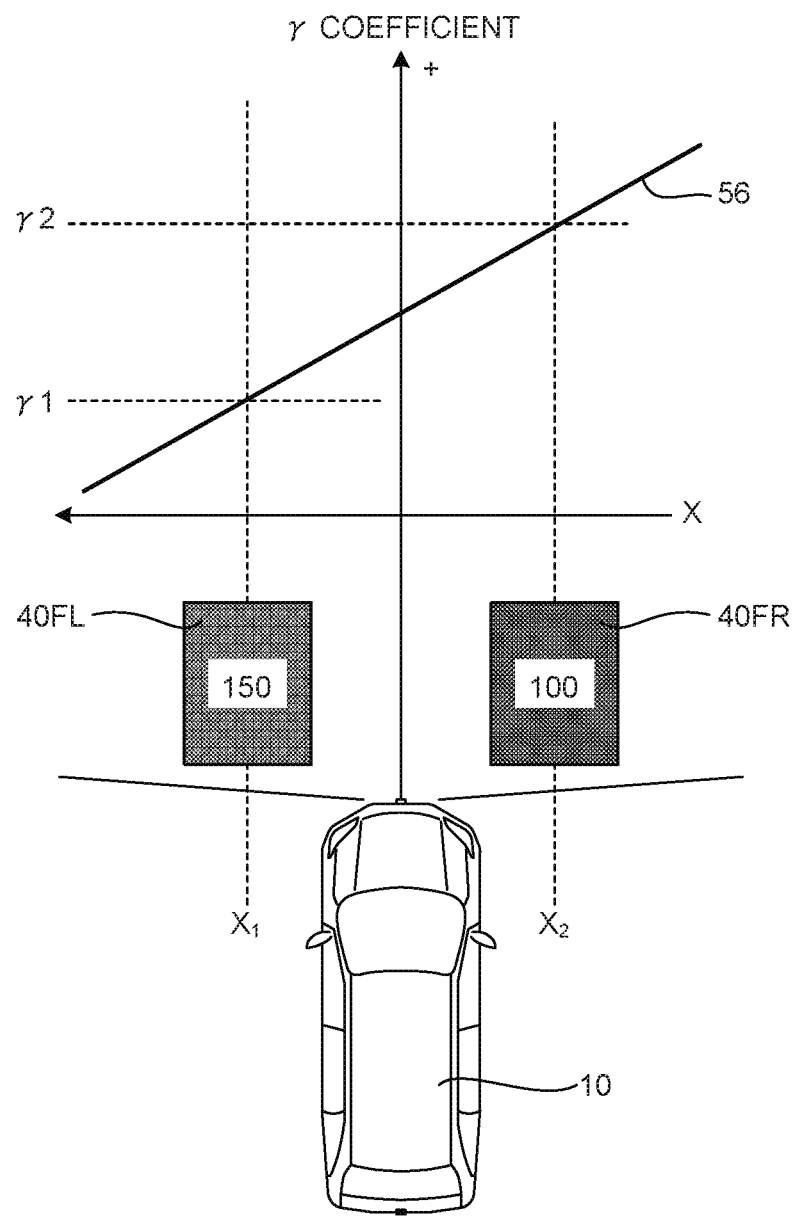
FIG. 16 is a schematic view of a linear interpolation formula generated using the γ-curve coefficients in FIGS. 14 and 15.

The linear interpolator 34a generates a linear interpolation formula 56 using the γ-curve coefficients γ1 and γ2 calculated by the γ-curve coefficient calculator 34c. FIG. 16 illustrates the linear interpolation formula 56 (γ=aX+b) with the vertical axis indicating the γ-curve coefficient and the horizontal axis indicating the positional coordinate of the object to be corrected in luminance in the vehicular transverse direction. In the graph the γ-curve coefficient is γ1 at the central coordinate X1 of the region of interest 40FL and is γ2 at the central coordinate X2 of the region of interest 40FR. Thus, the luminance setter 34d calculates a γ-curve coefficient for the position of the object to be corrected between the region of interest 40FL and the region of interest 40FR by the linear interpolation formula 56. The luminance setter 34d substitutes the calculated γ-curve coefficient and the luminance of the position of the object to be corrected (luminance value of original image, i.e., input luminance $Y_0$) into the relation: $Y_1=Y_0^{1/\gamma}$ between the input luminance $Y_0$ (luminance of original image) and the output luminance $Y_1$. As a result, the luminance setter 34d can calculate corrected luminance (output luminance $Y_1$) of the region between the pair of regions of interest 40. Through such correction to the rest of the images, it is possible to generate a recognizable peripheral image with less shadows clipping (too dark as a result of correction) or highlights clipping (too light as a result of correction) and less missing information. Thus, an easily-recognizable peripheral image can be generated.

Next, another example of processing of the image processing system 100 (image processing device) will be described with reference to the flowchart of FIG. 17 and FIGS. 18 to 20.

Figure 17:
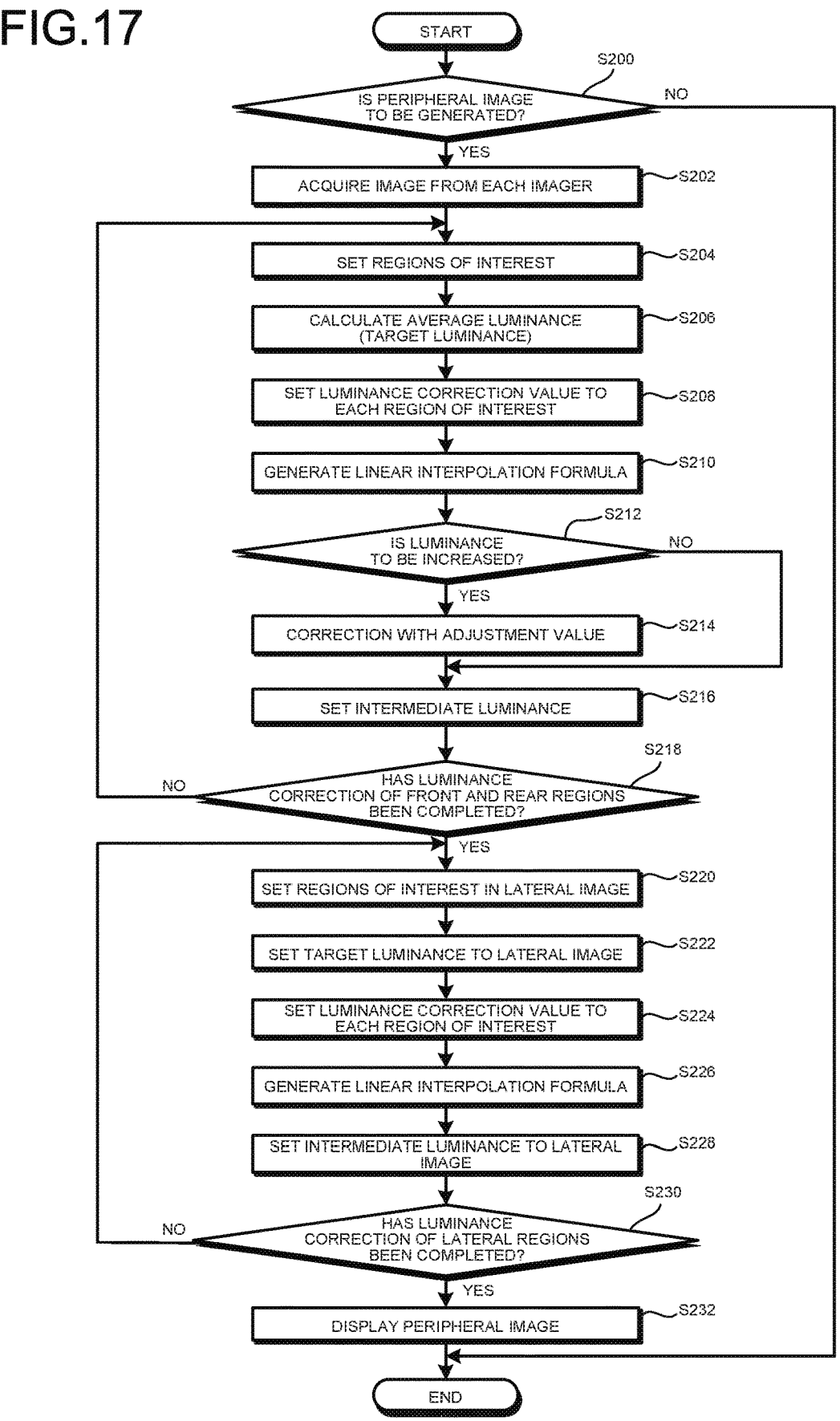
FIG. 17 is a flowchart illustrating an exemplary processing of correcting luminance of a normal state in the situation around the vehicle by a linear interpolation formula (to raise luminance) using a given value (fixed value) in the image processing device according to the embodiment.

Referring to the flowchart of FIG. 17, luminance correction (to raise luminance) in the normal state of luminance will be described. That is, the fixed-value addition setter 32b corrects a linear interpolation formula with a given value while the images generated by the imagers 14 are unlikely to exhibit a large difference in luminance.

First, the CPU 24a determines whether now is the time to generate a bird's-eye peripheral image around the vehicle 10 (S200). The CPU 24a makes an affirmative determination, for example, in response to the operational state of the vehicle 10 (e.g., the shift lever shifted to reverse) or a driver's operation for a display request through the operation input unit 20. After the CPU 24a determines generation of the peripheral image (Yes in S200), the acquirer 28 acquires images (image information) of the imaging region 36 generated by the imagers 14 (S202). After determining that now is not the time to generate a peripheral image (No in S200), the CPU 24a temporarily ends the flow of FIG. 17.

Figure 18:
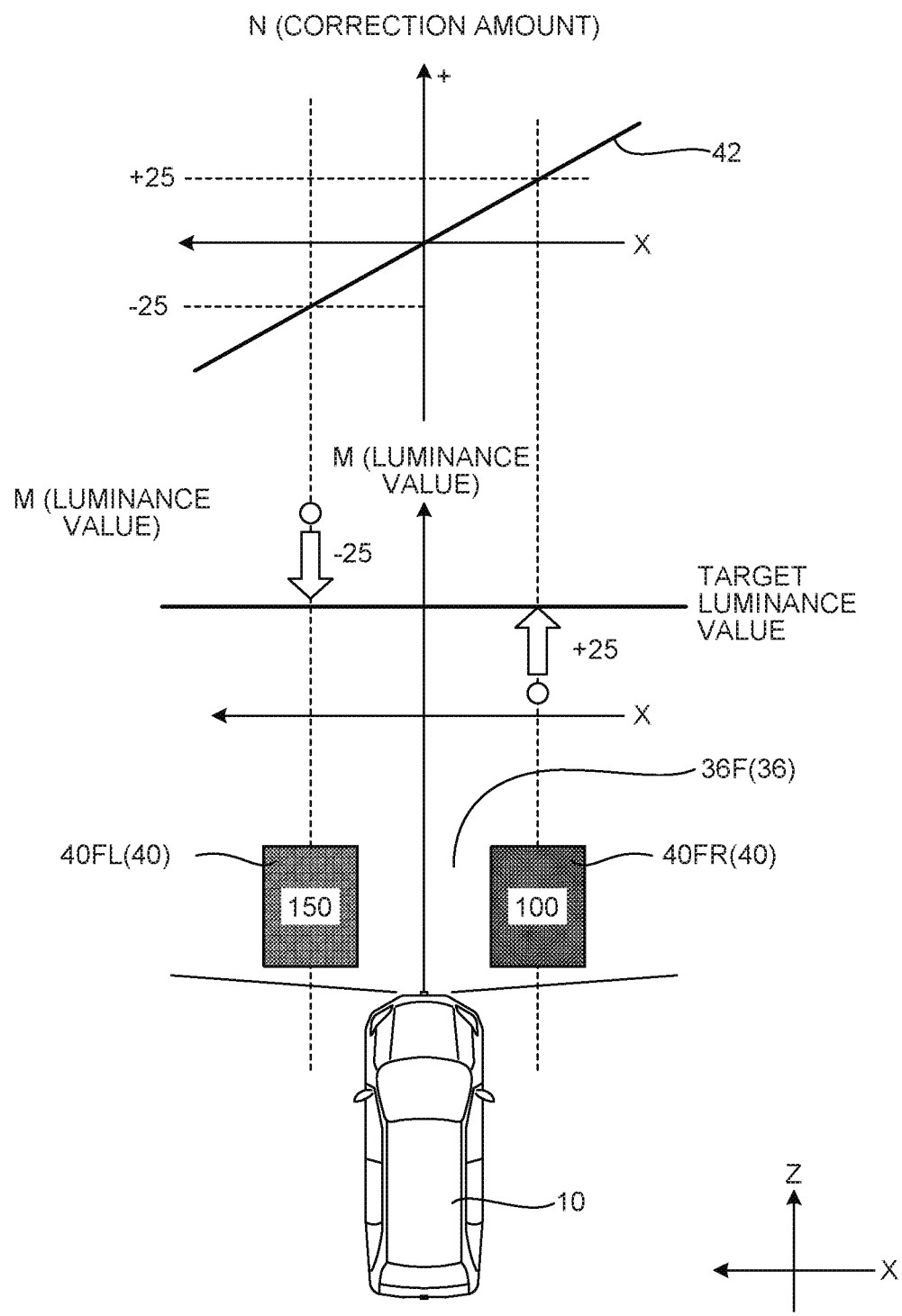
FIG. 18 is a schematic view illustrating an exemplary linear interpolation formula before correction in the image processing in FIG. 17 in the case of setting the target luminance of the regions of interest in the imaging region ahead of the vehicle in accordance with the average value of a pair of regions of interest.

Subsequently, the region-of-interest setter 30 sets regions of interest 40 in the respective imaging regions 36 of the acquired images (S204). For the imaging region 36F ahead of the vehicle 10, for example, the fixed-value addition setter 32b calculates the average value (average luminance of the regions of interest 40) of luminance of the two set regions of interest 40 (the region of interest 40FL and the region of interest 40FR) in the vehicular transverse direction, to set the average value as the target luminance of the imaging region 36F (S206). For example, as illustrated in FIG. 18, the left-side region of interest 40FL of the imaging region 36F in the vehicular transverse direction (X-axis direction) exhibits luminance of 150 in 256 levels and the right-side region of interest 40FR exhibits luminance of 100 in 256 levels. In this case, the fixed-value addition setter 32b sets the target luminance to 125, and sets luminance correction values for correcting the luminance of the region of interest 40FL and the region of interest 40FR to the target luminance (e.g., 125) (S208). In FIG. 18, in the imaging region 36F, a correction value of −25 is set to the region of interest 40FL as a luminance value M, and a correction value of +25 is set to the region of interest 40FR as a luminance value M.

The linear interpolator 34a generates a linear interpolation formula 42 using the correction value (N=−25) of the region of interest 40FL and the correction value (N=+25) of the region of interest 40FR set by the first setter 32 (S210). As a result, the luminance correction amount of the region between the region of interest 40FL and the region of interest 40FR in the vehicular transverse direction (X-axis direction) is represented by the linear interpolation formula 42F.

Figure 19:
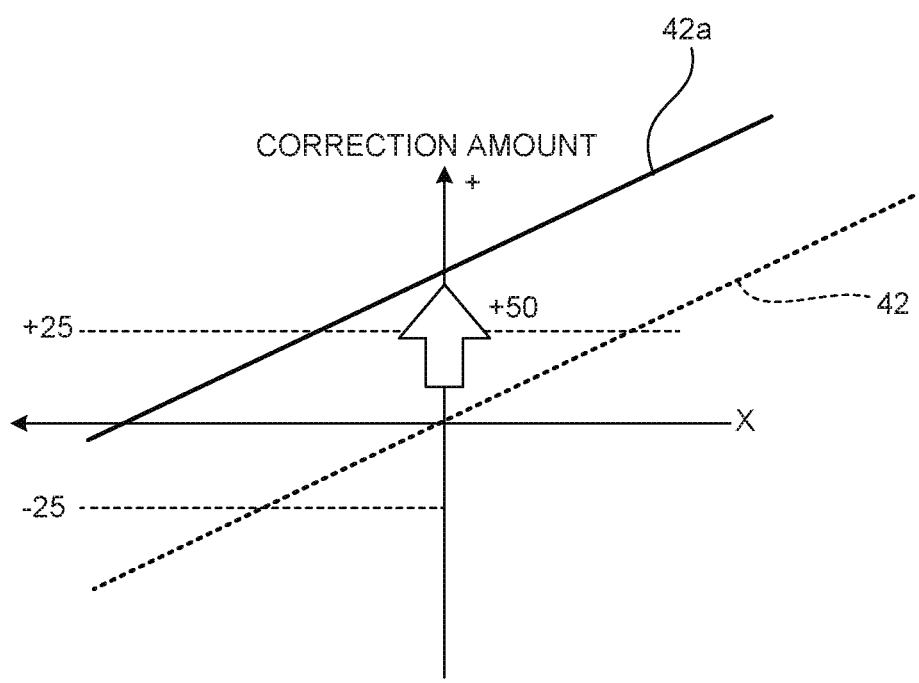
FIG. 19 is an exemplary schematic view illustrating correcting (to raise luminance) the linear interpolation formula in FIG. 18 with a given value (adjusted value)

In this example, the target luminance is set from the average luminance value of the two regions of interest 40 (e.g., the region of interest 40FL and the region of interest 40FR) of the imaging region 36 being a subject of correction, to generate the linear interpolation formula 42. Because of this, the target luminance may be too low, that is, the corrected image may be not sufficiently bright although having subjected to luminance correction. Thus, after determining that the corrected luminance by the linear interpolation formula 42 is lower than the pre-set luminance (lower limit luminance) and it is to be increased (Yes in S212), the fixed-value addition setter 32b corrects the corrected luminance with a given value (adjusted value) (S214). For example, a predefined adjusted value (e.g., luminance adjustment value=50) is added to the correction values set in S208. That is, as illustrated in FIG. 19, the luminance adjustment value=50 is added to the correction values (−25 and +25) to match the target luminance (e.g., 125) set from the average value of the luminance of the region of interest 40FL and the luminance of the region of interest 40FR. In other words, the linear interpolation formula 42 is directly shifted by a luminance value of +50 in the increasing direction, to generate a linear interpolation formula 42a. By the linear interpolation formula 42a, the luminance setter 34d sets (corrects) the luminance of the region between the region of interest 40FL and the region of interest 40FR and the luminance of the region in the vehicular longitudinal direction (Z-axis direction) of the imaging region 36F, with similar correction amounts (S216). In this case, the luminance of the imaging region 36F rises uniformly by +50, resulting in a bright image. In S212, after determining that the luminance to be corrected by the linear interpolation formula 42 matches or exceeds the pre-set luminance (lower limit luminance), the fixed-value addition setter 32b determines no increase in luminance (No in S212), skipping the operation in S214.

The first setter 32 monitors the imaging region 36F ahead of the vehicle 10 and the imaging region 36R behind the vehicle 10 to determine whether or not luminance correction has been completed (S218). After determining incompletion (No in S218), the CPU 24a returns to S204 and performs the same processing. After completion of the luminance correction of the imaging region 36F ahead of the vehicle 10 and the imaging region 36R behind the vehicle 10 (Yes in S218), the first setter 32 sets regions of interest 40 for luminance correction of the imaging region 36SL and the imaging region 36SR lateral to the vehicle 10 (S220). Then, the first setter 32 sets the corrected luminance of the regions of interest 40 of the imaging region 36F and the imaging region 36R, as the target luminance of the regions of interest 40 of the imaging region 36SL and the imaging region 36SR (S222).

Figure 20:
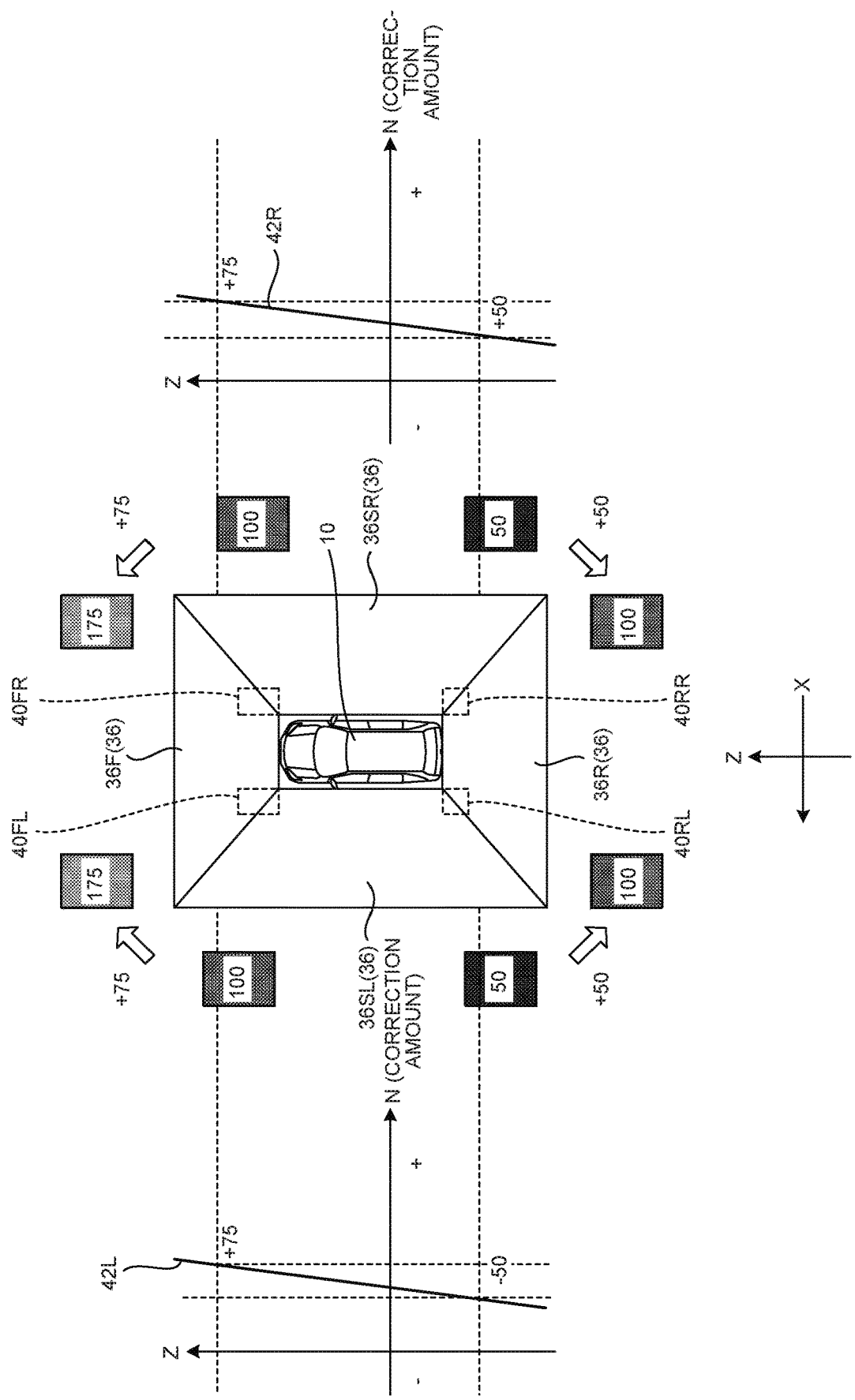
FIG. 20 is an exemplary schematic view illustrating setting luminance to the lateral imaging regions after the front imaging region by the corrected linear interpolation formula in FIG. 19 and setting luminance to the rear imaging region by a similar method.

For example, as illustrated in FIG. 20, when the region of interest 40FL in the imaging region 36F exhibits luminance of 175 after correction and the region of interest 40FL of the imaging region 36SL exhibits luminance of 100 before correction (at the time of imaging), the first setter 32 sets the target luminance of the region of interest 40FL of the imaging region 36SL to 175 (S222). That is, the first setter 32 sets the correction value for the region of interest 40FL of the imaging region 36SL to +75 (S224). Meanwhile, when the region of interest 40RL in the imaging region 36R exhibits luminance of 100 after correction and the region of interest 40RL of the imaging region 36SL exhibits luminance of 50 before correction (at the time of imaging), the first setter 32 sets the target luminance of the region of interest 40RL of the imaging region 36SL to 100 (S222). That is, the correction value for the region of interest 40RL of the imaging region 36SL is +50 (S224).

The linear interpolator 34a generates a linear interpolation formula 42L, using the correction value (N=+75) of the region of interest 40FL and the correction value (N=+50) of the region of interest 40RL set by the first setter 32 (S226). As a result, the correction amount of the luminance of the region between the region of interest 40FL and the region of interest 40RL in the vehicular longitudinal direction (Z-axis direction) is represented by the linear interpolation formula 42L. By the linear interpolation formula 42L, the luminance setter 34d sets (corrects) the luminance of the region between the region of interest 40FL and the region of interest 40RL and the luminance of the region in the vehicular transverse direction (X-axis direction) of the imaging region 36SL, with similar correction amounts (S228).

The first setter 32 monitors the imaging region 36SL and the imaging region 36SR left and right lateral to the vehicle 10 to determine whether or not luminance correction has been completed (S230). After determining incompletion of the luminance correction (No in S230), the first setter 32 returns to S220 to generate a linear interpolation formula 42R for the imaging region 36SR by the similar processing, and correct the luminance of the right-lateral image. Meanwhile, after completion of the luminance correction of the left-lateral imaging region 36SL and the right-lateral imaging region 36SR (Yes in S230), the CPU 24a causes the display controller 24d to generate a bird's-eye peripheral image by combining the images together for display on the display 16 (S232). The CPU 24a repeats the processing from S200 in the next processing cycle, to update the peripheral image. In this case, as illustrated in FIG. 20, the imaging region 36F and the imaging region 36SL both including the region of interest 40FL are combined smoothly with luminance of 175. Similarly, the imaging region 36SL and the imaging region 36R both including the region of interest 40RL with luminance of 100 are combined smoothly. The imaging region 36R and the imaging region 36SR both including the region of interest 40RR with luminance of 100 are combined smoothly. The imaging region 36SR and the imaging region 36F both including the region of interest 40FR are combined smoothly with luminance of 175. That is, the generated peripheral image is a natural, viewable image of smoothly combined images with no difference in luminance at the connecting parts. Further, the regions between the regions of interest 40 are corrected in luminance by the corresponding linear interpolation formula 42a, 42L, or 42R, which prevents a peripheral image including too bright or too dark parts from being generated, and improves recognition of the image content in any part of the peripheral image. As described above, the gradient of a linear interpolation formula can be corrected and a linear interpolation formula with a γ-curve coefficient can be calculated by the processing of FIG. 17, which can attain similar effects.

Next, another exemplary processing of the image processing system 100 (image processing device) will be described with reference to the flowchart of FIG. 21 and FIGS. 22 to 24.

Figure 21:
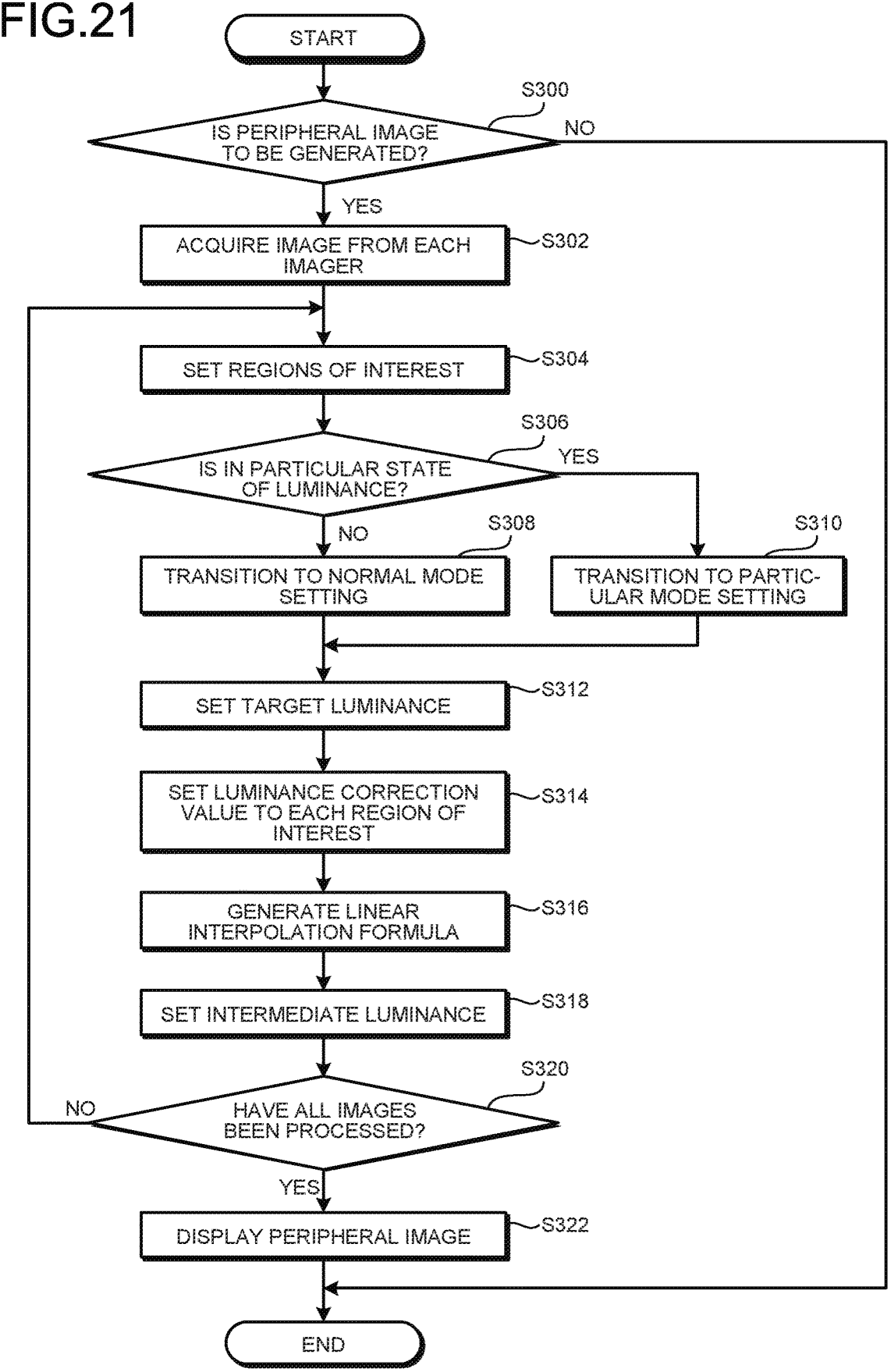
FIG. 21 is an exemplary flowchart illustrating processing of correcting luminance after a determination is made on whether or not the situation around the vehicle is in a particular state of luminance in the image processing device according to the embodiment.

Referring to the flowchart of FIG. 21, luminance correction including determining whether or not the ambient brightness of the vehicle 10 is in the particular state of luminance will be described, namely, when the images generated by the imagers 14 may exhibit a large difference in luminance.

First, the CPU 24a determines whether now is the time to generate a bird's-eye peripheral image around the vehicle 10, as in the other correction process (S300). The CPU 24a makes an affirmative determination, for example, in response to the operational state of the vehicle 10 (e.g., the shift lever shifted to reverse) or a driver's operation for a display request through the operation input unit 20. After the CPU 24a determines generation of the peripheral image (Yes in S300), the acquirer 28 acquires an image (image information) of the imaging regions 36 generated by the imagers 14 (S302). After determining that now is not the time to generation of the peripheral image (No in S300), the CPU 24a temporarily ends the flow of FIG. 21.

Subsequently, the region-of-interest setter 30 sets regions of interest 40 in the imaging region 36 of each acquired image (S304). With reference to the lateral image information (the imaging region 36SL and the imaging region 36SR), the particular mode determiner 31 determines whether the ambient brightness of the vehicle 10 is in the normal state of luminance or in the particular state of luminance (S306). After the particular mode determiner 31 determines that the ambient brightness of the vehicle 10 is not in the particular state of luminance (No in S306), the first setter 32 shifts the luminance correction setting to a normal mode setting corresponding to the normal state of luminance (S308). After the particular mode determiner 31 determines that the ambient brightness of the vehicle 10 is in the particular state of luminance (Yes in S306), the first setter 32 shifts the luminance correction setting to a particular mode setting corresponding to the particular state of luminance (S310).

Figure 6:
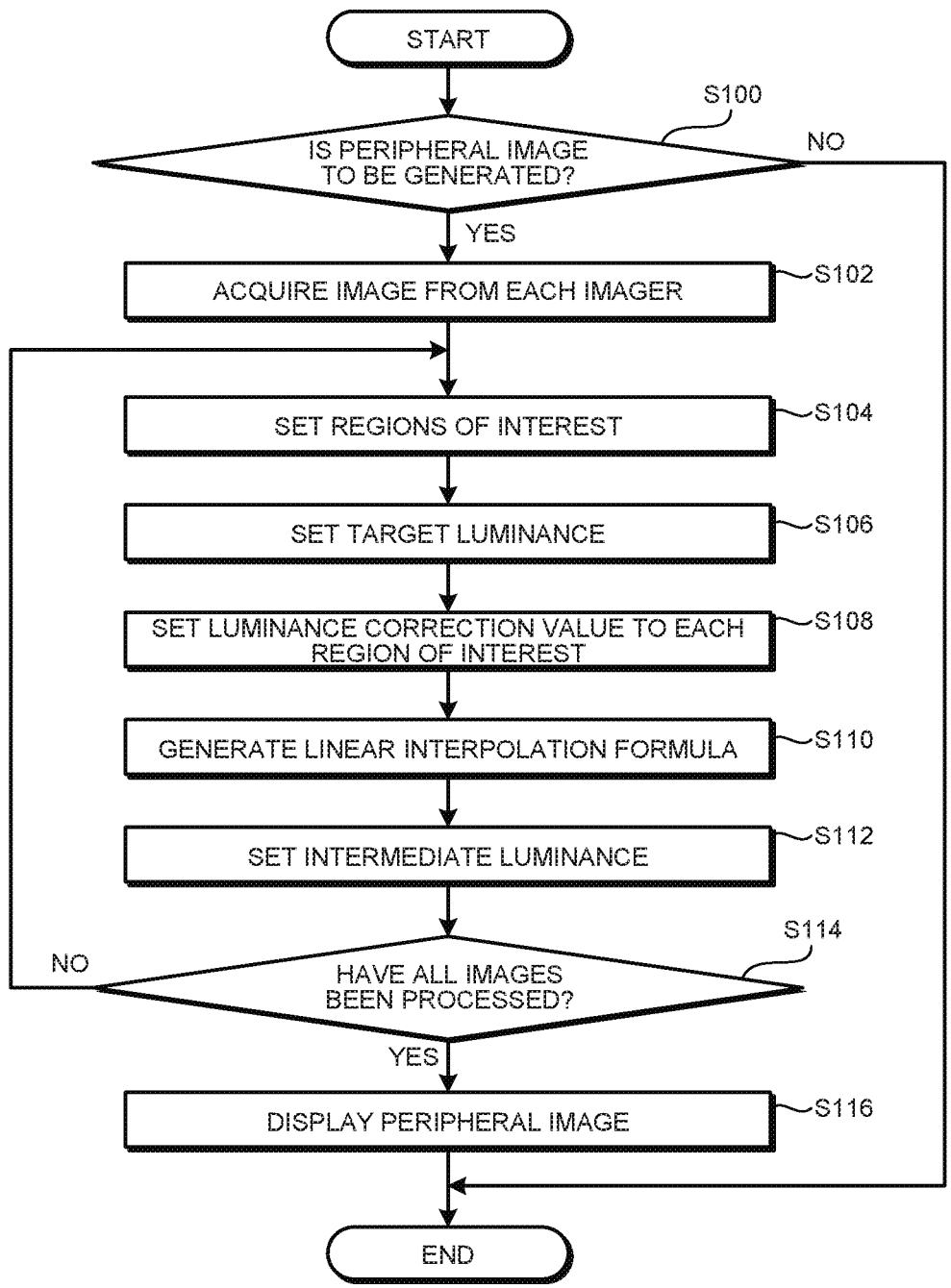
FIG. 6 is a flowchart illustrating an exemplary processing of correcting luminance of the situation around a vehicle with normal luminance using a fixed target luminance in the image processing device according to the embodiment.

In the normal mode setting, first, the imaging region 36F ahead of the vehicle 10 is subjected to processing similar to the processing described with the flowchart of FIG. 6. For example, the fixed-value setter 32a sets the target luminance of a given value (e.g., 200 in 256 levels) to each region of interest 40 (S312). As illustrated in FIG. 7, for example, the fixed-value setter 32a then sets a correction value for correcting the luminance of each region of interest 40 to the target luminance (e.g., 200) (S314).

Subsequently, the linear interpolator 34a generates a linear interpolation formula 42 (42F), using the correction value (e.g., N=−50) of the region of interest 40FL and the correction value (e.g., N=+50) of the region of interest 40FR set by the first setter 32 (S316). As a result, the correction amount (individual correction value) for the luminance of the region between the region of interest 40FL and the region of interest 40FR in the imaging region 36 in the vehicular transverse direction (X-axis direction) is represented by the linear interpolation formula 42F. Then, the luminance setter 34d corrects (sets) the luminance of the region between the region of interest 40FL and the region of interest 40FR according to the individual correction value calculated by the generated linear interpolation formula 42F. Similarly, the luminance setter 34d corrects (sets) the luminance of the region of the imaging region 36F in the vehicular longitudinal direction (Z-axis direction) with a similar individual correction value (S318). As a result, as illustrated in FIG. 8, in the imaging region 36F, the luminance of the left side (the region of interest 40FL) in the vehicular transverse direction is corrected to 200 decreased from 250 before correction, for example. The luminance of the right side in the vehicular transverse direction (the region of interest 40FR) is corrected to 200 increased from 150, for example.

In the normal mode setting, the CPU 24a monitors the entire screen to determine whether or not such correction processing has been completed (S320). After determining incompletion (No in S320), the CPU 24a returns to S304, and causes the region-of-interest setter 30, the first setter 32, and the second setter 34 to perform the above processing to the imaging region 36R, the imaging region 36SL, and the imaging region 36SR.

After determining completion of the correction processing to all the images (images of the imaging region 36F, the imaging region 36R, the imaging region 36SL, and the imaging region 36SR) (Yes in S320), the CPU 24a causes a peripheral image to be generated. That is, the CPU 24a causes the display controller 24d to generate a bird's-eye peripheral image by combining the images together for display on the display 16 (S322). The CPU 24a repeats the processing from S300 in the next processing cycle, to update the peripheral image. In this case, as illustrated in FIG. 10, the regions of interest 40 (40FL, 40RL, 40RR, and 40FR) all exhibit luminance of 200 in 256 levels, to be able to generate a peripheral image 44 of the smoothly combined imaging regions 36 (36F, 36SL, 36R, and 36SR). Further, the luminance of the regions between the regions of interest 40 is corrected by the corresponding linear interpolation formulas 42, which can prevent generation of a peripheral image containing any too bright or too dark part, and improve recognition of the image content in any part of the peripheral image 44. The fixed-value addition setter 32b may perform the luminance correction in the normal mode setting instead of the fixed-value setter 32a.

Meanwhile, in S306, after determining that the current state is the particular state of luminance and shifting the setting to the particular mode setting (S310), the particular mode corrector 32c sets the luminance of the images in the particular mode.

Figure 22:
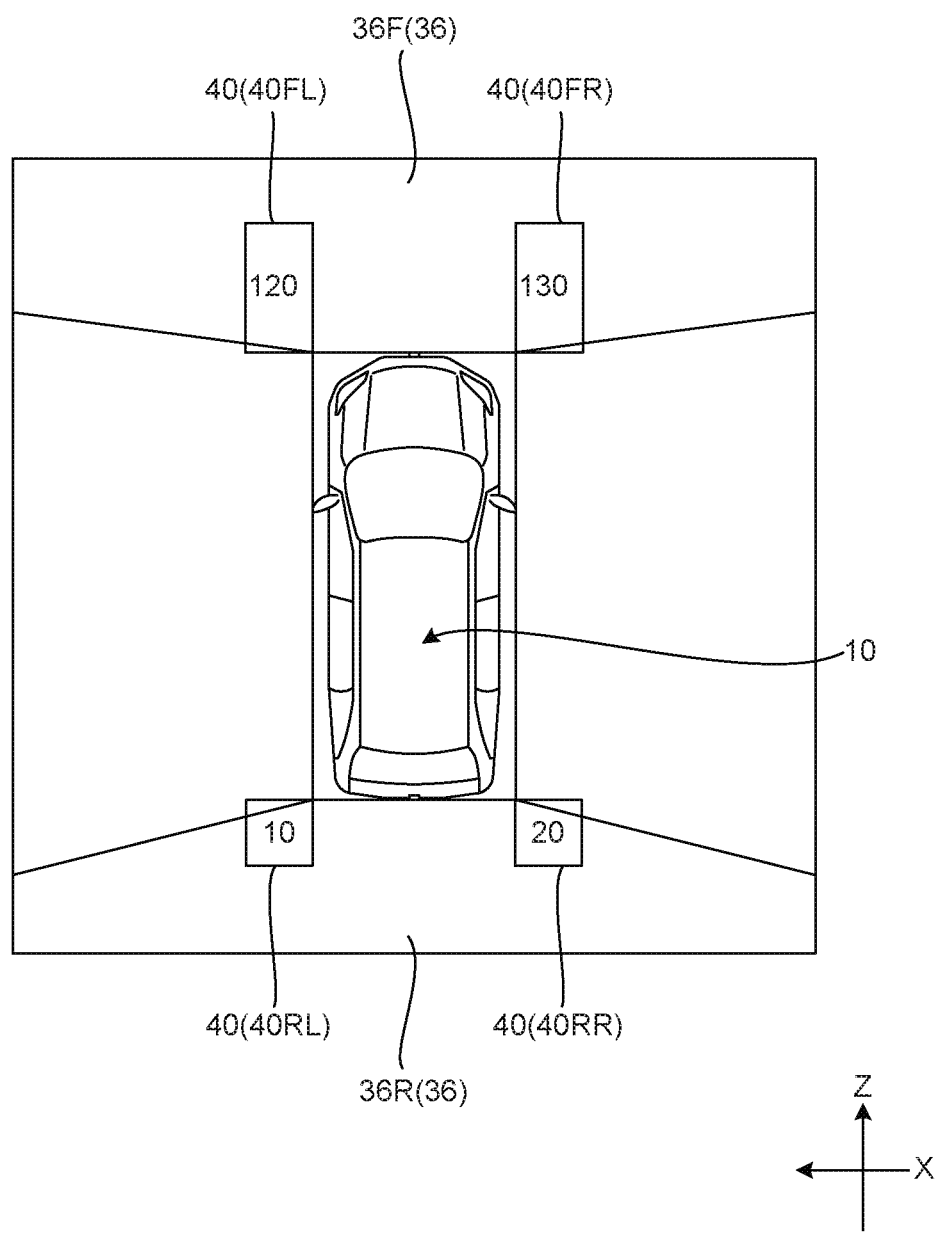
FIG. 22 is an exemplary schematic view illustrating luminance of regions of interest of the front image and the rear image in the particular state of luminance that can be determined by the image processing device according to the present embodiment.

FIG. 22 is a schematic view of an exemplary state of luminance at the time of imaging the imaging region 36F and the imaging region 36R ahead of and behind the vehicle 10 when the particular state of luminance is determined. As described above, while the vehicle 10 is located alone at night with no ambient light and with the headlights ON, for example, the area ahead of the vehicle 10 alone is very light. Thus, the imager 14a adjusts diaphragm for imaging and captures an image darker than the actual luminance. In FIG. 22, the luminance of the region of interest 40FL is decreased to 120, for example, and the luminance of the region of interest 40FR is decreased to, for example, 130. As for the imaging region 36R generated by the imager 14d in the area behind the vehicle 10 in complete darkness, the region of interest 40RL and the region of interest 40RR are increased in luminance to 10 and 20 due to diaphragm adjustment, respectively, by way of example.

In the particular mode setting, the particular mode corrector 32c corrects luminance of the imaging region 36F as with the fixed-value setter 32a, and corrects the luminance of the imaging region 36R as with the fixed-value setter 32a or the fixed-value addition setter 32b. Referring to the flowchart of FIG. 21, the particular mode corrector 32c sets fixed target luminance in the same manner as the fixed-value setter 32a by way of example. Thus, as described with reference to FIG. 7, the particular mode corrector 32c first sets the target luminance of a given value (e.g., 150 in 256 levels) to the region of interest 40FL and the region of interest 40FR (S312), and sets correction values for correcting the luminance of the region of interest 40FL and the luminance of the region of interest 40FR to the target luminance (e.g., 150). In this case, the correction value for the region of interest 40FL is set to, for example, N=+30, and the correction value for the region of interest 40FR is set to, for example, N=+20 (S314). Subsequently, the linear interpolator 34a generates a linear interpolation formula 42 (42F), using the correction value (e.g., N=+30) of the region of interest 40FL and the correction value (e.g., N=+20) of the region of interest 40FR set by the particular mode corrector 32c (S316). As a result, the correction amount of the luminance of the region between the region of interest 40FL and the region of interest 40FR in the vehicular transverse direction (X-axis direction) is represented by the linear interpolation formula 42F. Then, the luminance setter 34d corrects (sets) the luminance of the region between the region of interest 40FL and the region of interest 40FR in accordance with the correction value calculated by the generated linear interpolation formula 42F. The luminance setter 34d corrects (sets) the luminance of the region of the imaging region 36F in the vehicular longitudinal direction (Z-axis direction) by a similar correction value (S318). As a result, as illustrated in FIG. 8, in the imaging region 36F, the luminance of the left side (the region of interest 40FL) in the vehicular transverse direction is corrected to 150 increased from 120 before correction, for example, and the luminance of the right side (the region of interest 40FR) in the vehicular transverse direction is corrected to 150 increased from 130, for example.

In the particular mode setting, the CPU 24a monitors the entire screen to determine whether or not such correction processing has been completed (S320). In this case, after determining incompletion (No in S320), the CPU 24a returns to S304 and causes the region-of-interest setter 30, the first setter 32, and the second setter 34 to perform the above processing to the imaging region 36R. As a result, the imaging region 36R is corrected such that the luminance of the left side (the region of interest 40RL) in the vehicular transverse direction is increased, for example, from 10 to 150 and the luminance of the right side (the region of interest 40RR) in the vehicular transverse direction is increased, for example, from 20 to 150.

Figure 23:
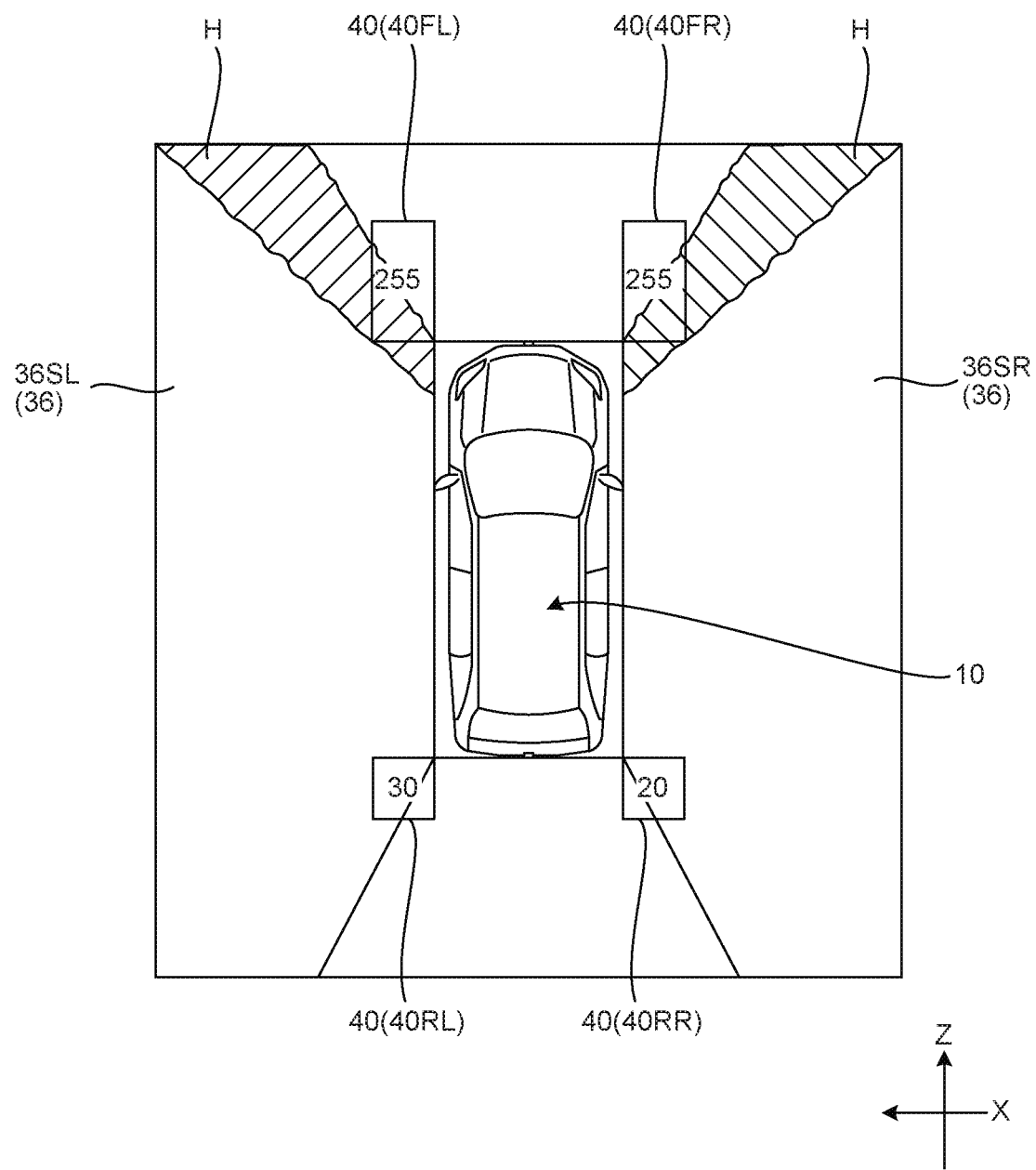
FIG. 23 is an exemplary schematic view illustrating luminance of the regions of interest of the right and left lateral images in the particular state of luminance that can be determined by the image processing device according to the present embodiment.

Next, the CPU 24a corrects luminance of the imaging region 36SL lateral to the vehicle 10 through the processing in S304 to S318. FIG. 23 is a schematic view of an exemplary state of luminance at the time of imaging the imaging region 36SL and the imaging region 36SR lateral to the vehicle 10 when the particular state of luminance is determined. For example, while the headlights of the vehicle 10 turn on at night in an environment with no light, only regions H ahead of the imaging region 36SL are very light and the rest of the regions are mostly very dark. Thus, the imager 14b adjusts diaphragm for imaging, and generates a brighter image than the actual luminance. In FIG. 23, the region of interest 40FL and the region of interest 40FR of the corresponding regions H are adjusted to increase in luminance, for example, to the maximum luminance value of 255. The region of interest 40RL behind the vehicle is corrected to increase in luminance to, for example, 30. The region of interest 40RR is adjusted to increase in luminance to, for example, 20.

In the particular mode setting, the particular mode corrector 32c sets a correction value (first correction value) for allowing the luminance of the front-side regions of interest 40 (the region of interest 40FL and the region of interest 40FR) in the imaging region 36SL and the imaging region 36SR to match the target luminance (first target luminance), in accordance with the luminance of the vehicular front region. For example, as illustrated in FIG. 24, the current luminance (e.g., 255) of the front-side region of interest 40FL in the imaging region 36SL is directly set as the target luminance (S312). Thus, the correction value for the region of interest 40FL is set to N=+0 (S314) without luminance adjustment.

Meanwhile, the particular mode corrector 32c sets a correction value (second correction value) for allowing the luminance of the regions of interest (the regions of interest 40RL and 40RR: second regions of interest) of the vehicular rear region in the imaging region 36SL and the imaging region 36SR to match the target luminance (second target luminance), in accordance with the luminance of rear image information representing the image of the imaging region 36R behind the vehicle. As described above, the particular mode corrector 32c corrects the luminance of the imaging region 36R to the predefined target luminance of the given value (e.g., 150). Thus, the particular mode corrector 32c sets the correction values (second correction value) of the region of interest 40RL and the region of interest 40RR so that their luminance turns to the same target luminance 150. Because of this, in FIG. 24, the correction value of the region of interest 40RL in the imaging region 36SL is set to N=+120 (S314).

Subsequently, the linear interpolator 34a generates a linear interpolation formula 42 (42L), using the correction value (e.g., N=+0) of the region of interest 40FL and the correction value (e.g., N=+120) of the region of interest 40RL set by the particular mode corrector 32c (S316). As a result, the correction amount of the luminance of the region between the region of interest 40FL and the region of interest 40RL in the vehicular longitudinal direction (Z-axis direction) is represented by the linear interpolation formula 42L. The luminance setter 34d corrects (sets) the luminance of the region between the region of interest 40FL and the region of interest 40RL according to the correction value calculated by the generated linear interpolation formula 42L. The luminance setter 34d sets (corrects) the luminance of the region of the imaging region 36SL in the vehicular transverse direction (X-axis direction) with a similar correction value (S318). As such, the luminance of the vehicular front region of the imaging region 36SL is corrected in luminance by the linear interpolation formula 42L such that the correction amount of the region of interest 40FL is set to N=+0 and the correction amount of the region of interest 40RL is set to +120. This results in reducing the correction amount for the image in a bright state. That is, through the luminance correction by the fixed-value setter 32a or the fixed-value addition setter 32b alone, the luminance of the left front region of the vehicle 10 in which the influence of the headlights appears is lowered, resulting in deterioration in viewability of the image content. Meanwhile, according to the present embodiment, the particular mode corrector 32c determines the particular state of luminance from the image of the imaging region 36SL to be able to maintain the brightness of the vehicular left front region and the viewability thereof.

The particular mode corrector 32c corrects luminance of the imaging region 36SR through the processing in S304 to S318, as that of the imaging region 36SL. As a result, the luminance of the vehicular front region of the imaging region 36SR is corrected by a linear interpolation formula 42R such that the correction amount for the region of interest 40FR is set to N=+0 and the correction amount for the region of interest 40RR is set to +130. This results in reducing the correction amount for the image in a bright state. That is, through the luminance correction by the fixed-value setter 32a or the fixed-value addition setter 32b alone, the luminance of the right front region of the vehicle 10 in which the influence of the headlights appears is lowered, resulting in deterioration in viewability of the image content. Meanwhile, according to the present embodiment, the particular mode corrector 32c determines the particular state of luminance from the image of the imaging region 36SR to be able to maintain the brightness of the vehicular right front region and the viewability thereof.

After completion of the processing to all the images (images of the imaging region 36F, the imaging region 36R, the imaging region 36SL, and the imaging region 36SR) (Yes in S320), the CPU 24a causes the display controller 24d to generate a bird's-eye peripheral image by combining the images together for display on the display 16 (S322). The CPU 24a repeats the processing from S300 in the next processing cycle, to update the peripheral image.

As such, through the luminance correction by the particular mode corrector 32c, it is possible to prevent deterioration in viewability in the particular state of luminance that the image may partially contain a dark region with lower viewability, which would otherwise occur due to luminance correction by the fixed-value setter 32a or the fixed-value addition setter 32b alone. In the connecting parts among the imaging region 36F, the imaging region 36SL, and the imaging region 36SR, the boundaries of luminance may occur due to higher-luminance parts caused by the light from the headlights. However, the connecting parts among the imaging region 36R, the imaging region 36SL, and the imaging region 36SR are subjected to luminance adjustment in accordance with the luminance of the imaging region 36R, resulting in smooth combining of the regions. As a result, it is possible to generate a peripheral image with a generally smooth variation in luminance and with good viewability as a whole.

In the example described above, the particular mode corrector 32c sets the current luminance (e.g., 255) of the front-side region of interest 40FL and region of interest 40FR in the imaging region 36SL and the imaging region 36SR directly to the target luminance, thereby preventing decrease in the viewability of the vehicular front part of each lateral image. According to another embodiment, as illustrated in FIG. 24, to set a correction value (first correction value) for each of the regions of interest 40 (regions of interest 40FL and 40FR: first regions of interest), the first regions of interest may be moved to a region around the first region of interest (a shift region 40FLd or a shift region 40FRd) and having luminance less than a first given value (e.g., the target luminance value of the imaging region 36F being 150), to set the luminance of each of the shift region 40FLd and the shift region 40FRd as the first target luminance. In this case, the correction values for the regions after moved (the shift region 40FLd and the shift region 40FRd) are +0. Meanwhile, the part of the vehicular rear side of the imaging region 36SL is mostly dark with no difference in luminance, so that the luminance of the entire region is regarded as similar to that of the region of interest 40RL, for example, 30. Thus, for the imaging region 36SL, a linear interpolation formula 42 is found such that the correction amount of the shift region 40FLd (region after moved) is set to N=+0 and the correction amount of the region of interest on the vehicular rear side relative to the shift region 40FLd is set to +120. This results in decreasing the correction amount of the bright region on the vehicular front side at the time of imaging, as with setting the luminance of the region of interest 40FL directly to the target luminance. That is, it is made possible to reduce the variation in the luminance of the region on the vehicular front side and maintain the viewability of image content thereof. In this case, it is also possible to prevent the lateral image from becoming extremely dark and correct the luminance of the entire lateral image without correcting a bright region with luminance of the first given value or more (bright region maintained). The same applies to the imaging region 36SR. This makes it possible to easily recognize the image content of a peripheral image generated by combining a plurality of images together.

The above has described the example of correcting the luminance of the imaging region 36R to the pre-set target luminance (e.g., 150) after transitioning to the particular mode setting. For another example, the average luminance value of the region of interest 40RL and the region of interest 40RR in the imaging region 36R may be calculated and set to the target luminance. In this case, the target luminance of the region of interest 40RL of the imaging region 36SL and the region of interest 40RR of the imaging region 36SR lateral to the vehicle 10 is set to the average value. By setting the average value as the target luminance of the region of interest 40RL and the region of interest 40RR of the imaging region 36R, the imaging region 36SL, and the imaging region 36SR, it is made possible to reduce differences in luminance between adjacent imaging regions 36 and smoothly connect the imaging regions 36 together. Further, the imaging region 36R being an actually completely dark region is displayed darkly close to the actual luminance, that is, less improvement in viewability. However, a peripheral image representing the actual situation more accurately can be displayed. The luminance of the imaging region 36F can be corrected by the average value, which may, however, excessively increase the luminance of the entire imaging region 36F due to the influence of the headlights. In view of this, the use of the average value may be decided in accordance with the luminance of the imaging region 36F.

The above embodiment has described the example that the target luminance set by the fixed-value setter 32a and the adjusted value set by the fixed-value addition setter 32b take given values regardless of the situation around the vehicle 10. For example, at night the surroundings of the display 16 are dark so that a decrease in the luminance of the entire image on the display 16 may not cause difficulty for the occupant to properly recognize image content. Conversely, in the daytime the surroundings of the display 16 are light, and an increase in the luminance of the display 16 may allow the occupant to easily recognize the image content. Thus, according to another embodiment, the given values may be changed in accordance with the state of the brightness around the vehicle 10 such as day and night or the setting of brightness of the display 16, for example.

According to the present embodiment, the imager 14b is fixed to the left side mirror 10b and the imager 14c is fixed to the right side mirror 10c. In this case, the imagers 14a and 14b can generate images with the doors of the vehicle 10 closed, making it possible to accurately combine the generated images. In other words, the display controller 24d has difficulty in accurately combining the images together with the doors open. Thus, with the doors open, the CPU 24a may not perform luminance correction as above but generate a peripheral image as a reference.

The image-processing computer program executed by the CPU 24a of the present embodiment may be recorded and provided in an installable or executable file format on a computer-readable recording medium, such as a CD-ROM, a flexible disk (FD), a CD-R, or a digital versatile disk (DVD).

Furthermore, the image-processing computer program may be stored on a computer connected to a network, such as the internet, and provided by being downloaded through the network. The image-processing computer program executed in the present embodiment may be provided or distributed through a network, such as the Internet.

While certain embodiments and modifications have been described, these embodiments and modifications have been presented by way of example only, and are not intended to limit the scope of the inventions. Indeed, the novel embodiments described herein may be embodied in a variety of other forms; furthermore, various omissions, substitutions and changes in the form of the embodiments and modifications described herein may be made without departing from the spirit of the inventions. The accompanying claims and their equivalents are intended to cover such forms or modifications as would fall within the scope and spirit of the inventions.

The invention claimed is:

1. An image processing device comprising:
a hardware processor configured to:
acquire a plurality of items of image information on a situation around a vehicle captured by a plurality of imagers provided in the vehicle;
determine lateral image information as a particular state of luminance when a first region of interest exhibits luminance of a first given value or more and a difference in luminance between the first region of interest and a second region of interest is a second given value or more, the lateral image information representing an image of a lateral of the vehicle, the first region of interest being included in a vehicular front region of the lateral image information, the second region of interest being included in a vehicular rear region of the lateral image information;

set, after the particular state of luminance is determined, a first correction value in accordance with luminance of the vehicular front region and sets a second correction value in accordance with luminance of rear image information, the first correction value for allowing the luminance of the first region of interest to match a first target luminance, the second correction value being for allowing the luminance of the second region of interest to match a second target luminance, the rear image information representing an image of a rear of the vehicle; and set, according to the first correction value and the second correction value, an individual correction value for correcting luminance of a region between the first region of interest and the second region of interest.

2. The image processing device according to claim 1, wherein in setting the first correction value, the hardware processor is further configured to set the luminance of the first region of interest as the first target luminance.

3. The image processing device according to claim 1, wherein in setting the first correction value, the hardware processor is further configure to move the first region of interest to a peripheral region with luminance less than the first given value, to set the luminance of the peripheral region as the first target luminance.

4. The image processing device according to claim 1, wherein in setting the second correction value, the hardware processor is further configure to set a given predefined target luminance as the second target luminance.

5. The image processing device according to claim 1, wherein the hardware processor is further configure to set the first region of interest in a first overlapping region and sets the second region of interest in a second overlapping region, the first overlapping region in which the vehicular front region of the lateral image information and front image information partially overlap each other, the second overlapping region in which the vehicular rear region of the lateral image information and the rear image information partially overlap each other, the front image information representing an image of a front of the vehicle.

* * * * *